United States Patent [19]

Okamoto et al.

[11] Patent Number: 5,776,996
[45] Date of Patent: Jul. 7, 1998

[54] PHOTOPOLYMERIZABLE COMPOSITION

[75] Inventors: Yasuo Okamoto; Tadahiro Sorori, both of Shizuoka, Japan

[73] Assignee: Fuji Photo Film Co., Ltd., Minami-ashigara, Japan

[21] Appl. No.: 802,813

[22] Filed: Feb. 19, 1997

[51] Int. Cl.⁶ .................. C08F 2/50; C08F 4/64; C08F 4/649
[52] U.S. Cl. .................. 522/26; 522/29; 522/2; 522/114; 522/121; 430/281.1
[58] Field of Search ................ 522/29, 28, 2, 522/114, 121, 26; 430/281.1

[56] References Cited

U.S. PATENT DOCUMENTS

| | | | |
|---|---|---|---|
| 5,011,755 | 4/1991 | Rohde et al. | 430/13 |
| 5,049,479 | 9/1991 | Zertani et al. | 522/29 |
| 5,049,481 | 9/1991 | Okamoto et al. | 430/283 |
| 5,192,642 | 3/1993 | Steiner et al. | 522/29 |
| 5,229,253 | 7/1993 | Zertani et al. | 522/29 |
| 5,322,762 | 6/1994 | Kushi et al. | 522/29 |
| 5,385,807 | 1/1995 | Okamoto et al. | 430/283 |
| 5,498,641 | 3/1996 | Urano et al. | 522/29 |
| 5,573,889 | 11/1996 | Hofmann et al. | 430/285.1 |
| 5,618,856 | 4/1997 | Yoshinaga et al. | 522/26 |
| 5,691,394 | 11/1997 | Kondo et al. | 522/29 |
| 5,700,849 | 12/1997 | Kondo et al. | 522/29 |

*Primary Examiner*—Susan W. Berman
*Attorney, Agent, or Firm*—Burns, Doane, Swecker & Mathis, LLP

[57] ABSTRACT

A photopolymerizable composition is disclosed, comprising i) an addition polymerizable compound having an ethylenically unsaturated double bond, ii) a sensitizing dye represented by the following formula (I) and iii) a titanocene compound:

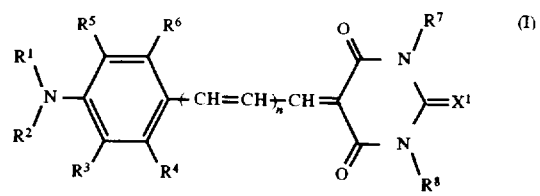

wherein $R^1$, $R^2$, $R^7$ and $R^8$ each represents a hydrogen atom, an alkyl group, an aryl group or an alkenyl group, $R^3$, $R^4$, $R^5$ and $R^6$ each represents a hydrogen atom, a halogen atom, an alkyl group, an aryl group, an alkoxy group or an alkoxycarbonyl group. $R^1$ and $R^2$ may be combined with each other to form a ring together with the nitrogen atom or $R^1$ and $R^5$ or $R^2$ and $R^3$ may be combined with each other to form a ring together with the carbon atoms and the nitrogen atom. $R^3$ and $R^4$ or $R^5$ and $R^6$ may be combined with each other to form a ring together with the two carbon atoms. $X^1$ represents an oxygen atom or a sulfur atom, and n represents 0, 1 or 2.

5 Claims, No Drawings

PHOTOPOLYMERIZABLE COMPOSITION

FIELD OF THE INVENTION

The present invention relates to a photopolymerizable composition, more particularly, it relates to a photopolymerizable composition highly sensitive to light rays in the visible light region and capable of showing good sensitivity also to, for example, $Ar^+$ laser light and YAG-SHG laser light.

BACKGROUND OF THE INVENTION

A large number of image formation methods using a photopolymerization system have been conventionally known and widely used in the fields such as printing plate, printed circuit, paint, ink, hologram recording and three dimensional formation. For example, there are known a method where a photopolymerizable composition comprising an addition-polymerizable compound having an ethylenic double bond, a photopolymerization initiator and further, if desired, an organic high molecular binder and a thermal polymerization inhibitor, is provided on a support to form a film layer, the layer is imagewise exposed to a desired image to cure the exposed area by polymerization and then the unexposed area is dissolved and removed to form a cured relief image, a method where a layer comprising the above-described photopolymerizable composition is provided between two supports, at least one support being transparent, the layer is imagewise exposed from the transparent support side to induce change in the adhesive strength by light and then the support is peeled off to form an image, a method where a photosensitive material having a microcapsule layer containing a photopolymerizable composition and a coloring material such as a leuco dye is prepared, the photosensitive material is imagewise exposed to photocure capsules in the exposed area, the capsules in the unexposed area are ruptured by pressure or heat treatment, the coloring material dissolved out is put into contact with the coloring material developer to effect coloration to thereby form a colored image, an image formation method using change in the toner adhesion property of the photopolymerizable composition due to light, and an image formation method using change in the refractive index of the photopolymerizable composition due to light.

The photopolymerizable composition applied to these methods uses in many cases benzyl, benzoin ether, Michler's ketone, anthraquinone, acridine, phenazine or benzophenone as a photopolymerization initiator. However, these photopolymerization initiators are extremely low in the photopolymerization initiation ability to visible light of 400 nm or more as compared with the photopolymerization initiation ability to ultraviolet light of 400 nm or less and accordingly, they are remarkably limited in the application range.

Recently, as the image formation technique has been developed, a photopolymer having high sensitivity to light rays in the visible region is being demanded. The photopolymer is a photosensitive material suitable, for example, for non-contact type plate making using projection exposure or for plate making using a visible light laser. Highly expected as the visible light laser are $Ar^+$ laser which emits light of 488 nm and a YAG-SHG laser which emits light of 532 nm.

With respect to the photopolymerization initiation system sensitive to light rays in the visible light region, many proposals have been hitherto made. Examples of the system include a certain kind of sensitive dyes described in U.S. Pat. No. 2,850,445, a composite initiation system of a dye and an amine (see, JP-B-44-20189 (the term "JP-B" as used herein means an "examined Japanese patent publication")), a combination use system of hexaarylbiimidazole, a radical generating agent and a dye (see, JP-B-45-37377), a system of hexaarylbiimidazole and p-dialkylaminobenzylidene ketone (see, JP-B-47-2528, JP-A-54-155292 (the term "JP-A" as used herein means an "unexamined published Japanese patent application")), a system of a cyclic cis-α-dicarbonyl compound and a dye (see, JP-A-48-84183), a system of a substituted triazine and a merocyanine dye (see, JP-A-54-151024), a system of 3-ketocoumarin and an activator (see, JP-A-52-112681, JP-A-58-15503), a system of biimidazole, a styrene derivative and a thiol (see, JP-A-59-140203), a system of an organic peroxide and a dye (see, JP-A-59-140203, JP-A-59-189340) and a system of a dye having a rhodanine skeleton and a radical generating agent (see, JP-A-2-244050).

The titanocene is effective as a photopolymerization initiator as described in JP-A-59-152396, JP-A-61-151197, JP-A-63-10602, JP-A-63-41484 and JP-A-3-12403, and examples of the combination use system thereof include a system of titanocene and a 3-ketocoumarin dye (see, JP-A-63-221110), a system where titanocene, a xanthene dye and further, an addition-polymerizable ethylenically unsaturated compound containing an amino group or a urethane group are used in combination (see, JP-A-4-221958, JP-A-4-219756) and a system of titanocene and a specific merocyanine dye (see, JP-A-6-295061).

These conventional techniques are surely effective to visible light rays, however, they have some problems such as insufficient sensitivity, making them impracticable.

SUMMARY OF THE INVENTION

An object of the present invention is to provide a highly sensitive photopolymerizable composition, particularly, a photopolymerizable composition highly sensitive to visible light rays of 400 nm or more and to light of 488 nm or 532 nm corresponding to the output of an $Ar^+$ laser or YAG-SHG laser, respectively.

The present inventors have found that a combination use system of a sensitizing dye having a specific structure and a titanocene compound capable of generating active radicals on irradiation of light in the presence of the sensitizing dye exhibits very high sensitivity to the visible light rays of 400 nm or more, and based on this finding, the present invention has been accomplished.

More specifically, the present invention has been attained by the following specific matter (1), preferably specific matter (2):

(1) a photopolymerizable composition comprising i) an addition polymerizable compound having an ethylenically unsaturated double bond, ii) a sensitizing dye represented by the following formula (I) and iii) a titanocene compound:

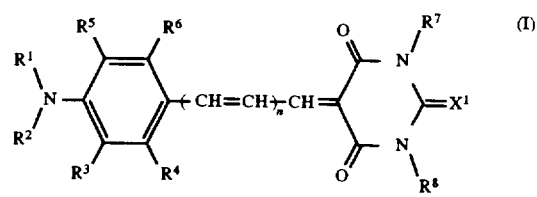

wherein $R^1$, $R^2$, $R^7$ and $R^8$ each represents a hydrogen atom, a substituted or unsubstituted alkyl group, a substituted or unsubstituted aryl group or a substituted or unsubstituted alkenyl group. $R^3$, $R^4$, $R^5$ and $R^6$ each represents a hydrogen atom, a halogen atom, a substituted or unsubstituted alkyl group, a substituted or unsubstituted aryl group, a substituted or unsubstituted alkoxy group or a substituted or unsubstituted alkoxycarbonyl group. $R^1$ and $R^2$ may be combined with each other to form a ring together with the nitrogen atom or $R^1$ and $R^5$ or $R^2$ and $R^3$ may be combined with each other to form a ring together with the carbon atoms and the nitrogen atom. $R^3$ and $R^4$ or $R^5$ and $R^6$ may be combined with each other to form a ring together with the two carbon atoms. $X^1$ represents an oxygen atom or a sulfur atom, and n represents 0, 1 or 2;

(2) the photopolymerizable composition of item (1), wherein the photopolymerizable initiation system containing ii) a sensitizing dye and iii) a titanocene compound further contains at least one compound selected from the group consisting of the following compounds (a) to (h):

(a) a compound having a carbon-halogen bond;

(b) a ketone compound represented by the following formula (II):

wherein Ar represents an aromatic group represented by the following formula, $R^{10}$ and $R^{11}$ each represents a hydrogen atom or an alkyl group. $R^{10}$ and $R^{11}$ may be combined with each other to form a ring together with the carbon atom which both $R^{10}$ and $R^{11}$ are bonded to, and the ring formed by $R^{10}$, $R^{11}$ and the carbon atom may be a divalent group linking the carbonyl group and the morpholino group:

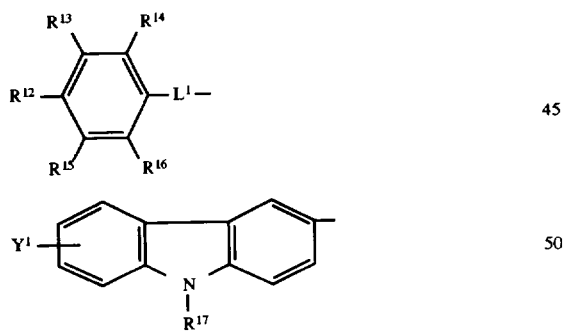

wherein $R^{12}$, $R^{13}$ $R^{14}$, $R^{15}$ and $R^{16}$, which may be the same or different, each represents a hydrogen atom, a halogen atom, an alkyl group, an alkenyl group, an aryl group, a hydroxyl group, an alkoxy group, —S—$R^{18}$, —SO—$R^{18}$ or —SO$_2$—$R^{18}$ (wherein $R^{18}$ represents a hydrogen atom, an alkyl group or an alkenyl group). $L^1$ represents a bond or an alkylene group, provided that when $L^1$ is a bond, at least one of $R^{12}$, $R^{13}$, $R^{14}$, $R^{15}$ and $R^{16}$ is —S—$R^{18}$ or —SO—$R^{18}$. $R^{17}$ represents a hydrogen atom, an alkyl group or an acyl group. and $Y^1$ represents a hydrogen atom or a substituted carbonyl group represented by the following formula:

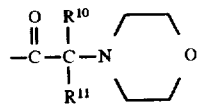

wherein $R^{10}$ and $R^{11}$ each has the same meaning as defined in formula (II);

(c) a ketoxime compound represented by the following formula (III):

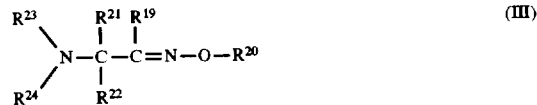

wherein $R^{19}$ and $R^{20}$, which may be the same or different, each represents an aliphatic hydrocarbon group, an aromatic hydrocarbon group, or a heterocyclic group, which may have a substituent and an unsaturated bond. $R^{21}$ and $R^{22}$, which may be the same or different, each represents a hydrogen atom, an aliphatic hydrocarbon group, an aromatic hydrocarbon group, a heterocyclic group, a hydroxy group, a substituted oxy group, a mercapto group or a substituted thio group. $R^{23}$ and $R^{24}$ each represents a hydrogen atom, an aliphatic hydrocarbon group or an aromatic hydrocarbon group, which may have an unsaturated bond or substituent(s), or a substituted carbonyl group. $R^{23}$ and $R^{24}$ may be combined with each other to form a ring having from 2 to 8 carbon atoms, and the ring may contain at least one of —O—, —NR$^{23}$— (wherein $R^{23}$ has the same meaning as above), —O—CO—, —NH—CO—, —S— and —SO$_2$— in the linking main chain;

(d) an organic peroxide;

(e) a thio compound represented by the following formula (IV):

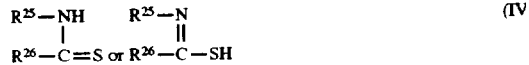

wherein $R^{25}$ represents an alkyl group or an aryl group $R^{26}$ represents a hydrogen atom or an alkyl group. $R^{25}$ and $R^{26}$ may be combined with each other to provide an atomic group necessary for completing a heterocyclic ring which may have a condensed ring, together with the carbon atom and the nitrogen atom;

(f) hexaarylbiimidazole;

(g) an aromatic onium salt; and (h) a ketoxime ester.

DETAILED DESCRIPTION OF THE INVENTION

The present invention is described below in detail.

The photopolymerizable composition of the present invention comprises i) an addition polymerizable compound having at least one ethylenically unsaturated double bond and as the photopolymerizable initiation system ii) a sensitizing dye represented by formula (I) and iii) a titanocene compound.

The polymerizable compound having an addition polymerizable unsaturated bond as component i) is selected from the compounds having at least one, preferably two or more terminal ethylenically unsaturated bonds. In other words, the compound has a chemical form such as a monomer, prepolymer, namely, a dimer, a trimer or an oligomer, mixture thereof or a copolymer thereof. Examples of the monomer and the copolymer thereof include an ester of an unsaturated carboxylic acid (e.g., acrylic acid, methacrylic acid, itaconic acid, crotonic acid, isocrotonic acid, maleic acid) with an aliphatic polyhydric alcohol compound and an amide of an unsaturated carboxylic acid with an aliphatic polyamine compound.

Specific examples of the ester monomer of an aliphatic polyhydric alcohol compound with an unsaturated carboxylic acid include:

an acrylic ester such as ethylene glycol diacrylate, triethylene glycol diacrylate, 1,3-butandiol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate and polyester acrylate oligomer;

a methacrylic ester such as tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis|p-(3-methacryloxy-2-hydroxypropoxy)phenyl| dimethylmethane and bis|p-(methacryloxyethoxy)phenyl|dimethylmethane;

an itaconic ester such as ethylene glycol diitaconate, propylene glycol diitaconate, 1,3-butanediol diitaconate, 1,4-butanediol diitaconate, tetramethylene glycol diitaconate, pentaerythritol diitaconate and sorbitol tetraitaconate;

a crotonic ester such as ethylene glycol dicrotonate, tetramethylene glycol dicrotonate, pentaerythritol dicrotonate and sorbitol tetradicrotonate;

an isocrotonic ester such as ethylene glycol diisocrotonate, pentaerythritol diisocrotonate and sorbitol tetraisocrotonate;

a maleic ester such as ethylene glycol dimaleate, triethylene glycol dimaleate, pentaerythritol dimaleate and sorbitol tetramaleate; and a mixture of these ester monomers.

Specific examples of the amide monomer of an aliphatic polyhydric amine compound with an unsaturated carboxylic acid include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide and xylylenebismethacrylamide.

Other examples include vinylurethane compounds having two or more polymerizable vinyl groups in one molecule resulting from adding a vinyl monomer containing a hydroxyl group represented by the following formula (V) to a polyisocyanate compound having two or more isocyanate groups in one molecule described in JP-B-48-41708:

(V)

(wherein R and R' each represents H or CH$_3$).

Further, polyfunctional acrylates and methacrylates such as urethane acrylates as described in JP-A-51-37193, polyester acrylates as described in JP-A-48-64183, JP-B-49-43191 and JP-B-52-30490 and epoxy acrylates obtained by reacting an epoxy resin with a (meth)acrylic acid, may be used. Furthermore, those described in The Adhesion Society of Japan, Journal of the Adhesion Society of Japan, vol. 20, No. 7, pp. 300–308 (1984) as photo-curable monomers and oligomers may be used. The added amount of the compound is from 5 to 50 wt %, preferably from 10 to 40%, based on all components. These compounds may be used either individually or in combination of two or more thereof.

The sensitizing dye which the photopolymerizable initiation system of the photopolymerizable composition of the present invention contains is one represented by formula (I) shown above.

In formula (I), $R^1$, $R^2$, $R^7$ and $R^8$, which may be the same or different, each represents a hydrogen atom, an alkyl group, an aryl group or an alkenyl group.

The alkyl group represented by $R^1$, $R^2$, $R^7$ or $R^8$ may have a substituent and preferably has from 1 to 12 carbon atoms. Examples of the substituent include an alkoxy group having from 1 to 6 carbon atoms (e.g., methoxy, ethoxy), a halogen atom (e.g., chlorine, bromine), a cyano group, an amino group, a dialkylamino group substituted by an alkyl group having from 1 to 4 carbon atoms (e.g., dimethylamino), an alkoxycarbonyl group containing an alkyl group having from 1 to 4 carbon atoms (e.g., methoxycarbonyl), an aryl group having from 6 to 10 carbon atoms (e.g., phenyl, p-methoxyphenyl, p-chlorophenyl), a carboxy group and a salt thereof, and a sulfo group and a salt thereof.

Examples of the alkyl group represented by $R^1$, $R^2$, $R^7$ or $R^8$ include a methyl group, an ethyl group, an n-propyl group, an isopropyl group, an n-butyl group, a t-butyl group, a phenylmethyl group, a chloroethyl group and a cyanoethyl group.

The aryl group represented by $R^1$, $R^2$, $R^7$ or $R^8$ may have a substituent and preferably has from 1 to 12 carbon atoms. Examples of the substituent include an alkyl group having from 1 to 6 carbon atoms (e.g., methyl, ethyl) and the alkoxy group, the halogen atom, the cyano group, the amino group, the dialkylamino group, the alkoxycarbonyl group, the carboxy group and a salt thereof, and the sulfo group and a salt thereof described above with respect to the substituent for the alkyl group as $R^1$, $R^2$, $R^7$ or $R^8$.

Examples of the aryl group represented by $R^1$, $R^2$, $R^7$ or $R^8$ include a phenyl group and a naphthyl group.

The alkenyl group represented by $R^1$, $R^2$, $R^7$ or $R^8$ may have a substituent and preferably has from 3 to 10 carbon atoms. Examples of the substituent include those described above with respect to the substituent for the alkyl group and the aryl group.

Examples of the alkenyl group represented by $R^1$, $R^2$, $R^7$ or $R^8$ include an allyl group.

$R^3$, $R^4$, $R^5$ and $R^6$ each represents a hydrogen atom, a halogen atom, an alkyl group, an aryl group, an alkoxy group or an alkoxycarbonyl group.

Examples of the halogen atom represented by $R^3$, $R^4$, $R^5$ or $R^6$ include chlorine and bromine.

Examples of the alkyl group and the aryl group represented by $R^3$, $R^4$, $R^5$ or $R^6$ include those described above with respect to $R^1$, $R^2$, $R^7$ and $R^8$.

The alkoxy group represented by $R^3$, $R^4$, $R^5$ or $R^6$ is preferably an alkoxy group having from 1 to 7 carbon atoms and examples thereof include a methoxy group and an ethoxy group.

The alkoxycarbonyl group represented by $R^3$, $R^4$, $R^5$ or $R^6$ is preferably an alkoxycarbonyl group having from 2 to 8 carbon atoms and examples thereof include a methoxycarbonyl group and an ethoxycarbonyl group.

$R^1$ and $R^2$ may be combined with each other to form a ring, and examples of the ring include a heterocyclic ring such as morpholine ring.

$R^1$ and $R^5$ or $R^2$ and $R^3$ may be combined with each other to form a ring together with the carbon atoms and the nitrogen atom, and examples of the ring include a heterocyclic ring such as piperidine ring and indoline ring. The ring completed by $R^1$ and $R^5$ and the ring completed by $R^2$ and $R^3$ may be condensed to each other.

$R^5$ and $R^6$ or $R^3$ and $R^4$ may be combined with each other to form a ring together with two carbon atoms, and examples of the ring include an aromatic hydrocarbon ring such as benzene ring and naphthalene ring, an aliphatic hydrocarbon ring such as cyclohexene ring, and a heterocyclic ring such as morpholine ring, piperidine ring, indoline ring and quinoline ring.

The above-described rings each may have a substituent and examples of the substituent include those described above as the substituent with respect to $R^1$, $R^2$, $R^7$ and $R^8$.

$X^1$ represents an oxygen atom or a sulfur atom.

n represents 0, 1 or 2.

Examples of the sensitizing dye of formula (I) are set forth below, however, the present invention is by no means limited thereto.

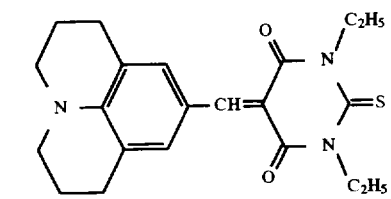
No. 1

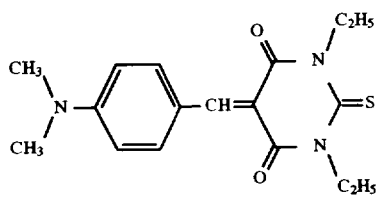
No. 2

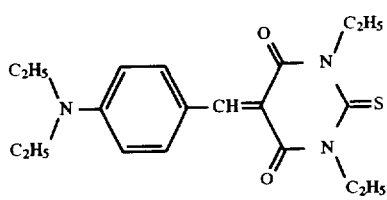
No. 3

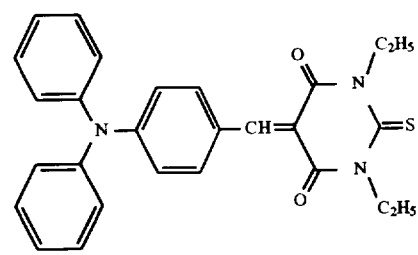
No. 4

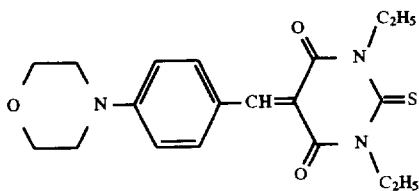
No. 5

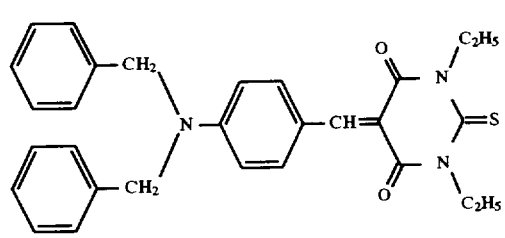
No. 6

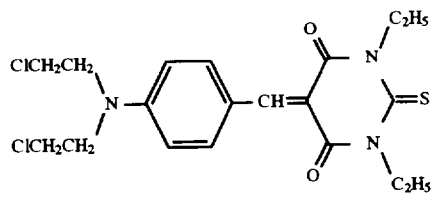
No. 7

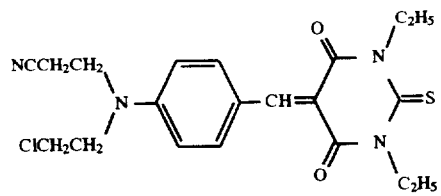
No. 8

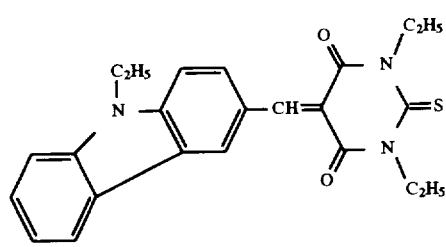
No. 9

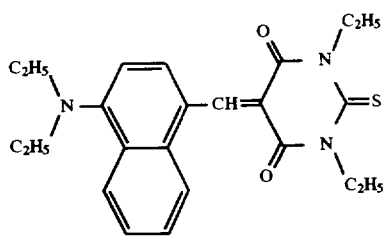
No. 10

-continued
No. 11
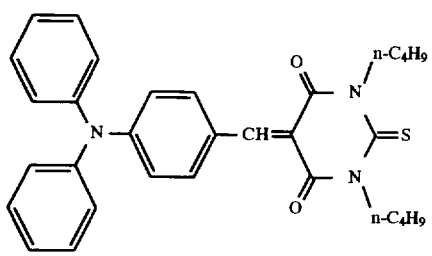
No. 12
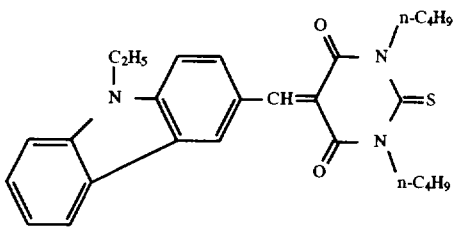
No. 13
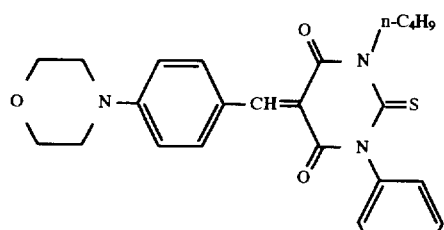
No. 14
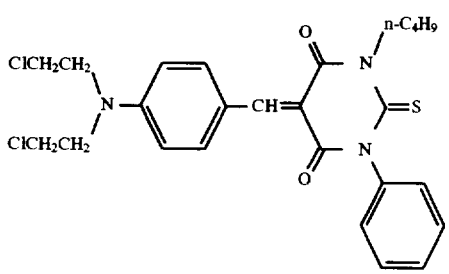
No. 15
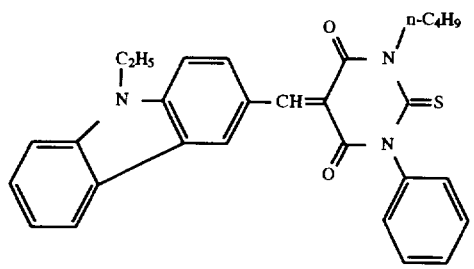
No. 16
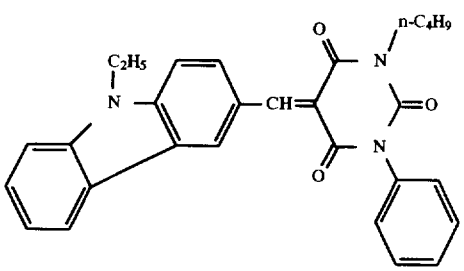
No. 17
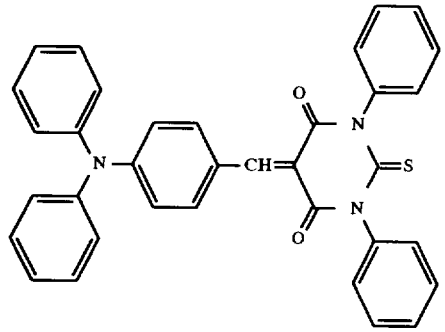
No. 18
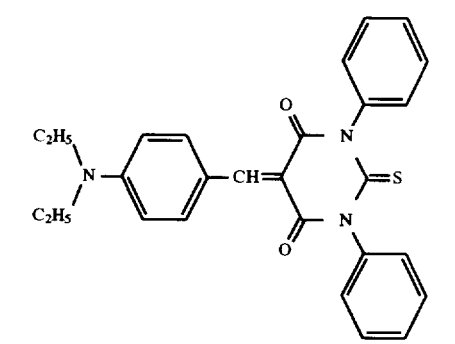
No. 19
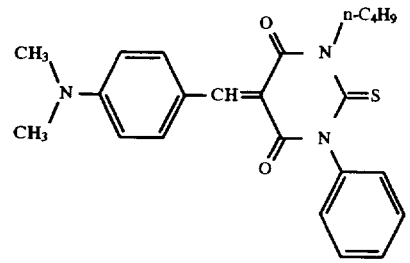
No. 20
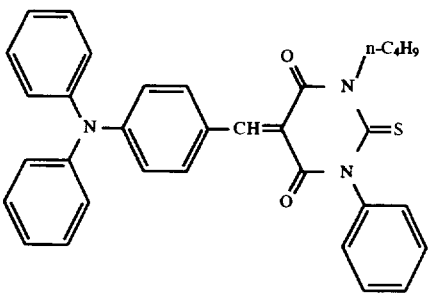
No. 21
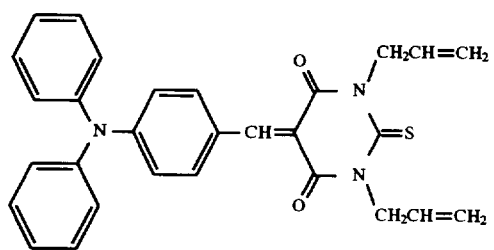
No. 22
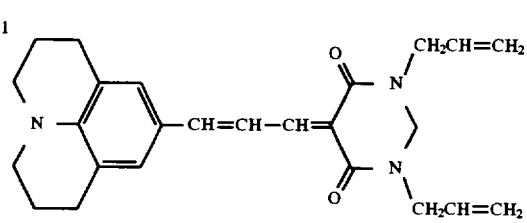

-continued
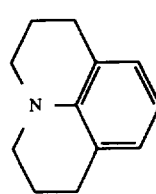 No. 23
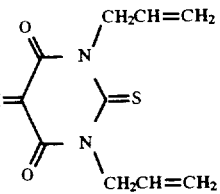
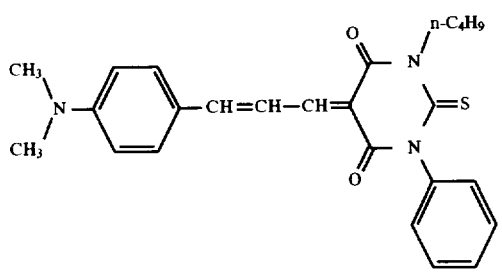 No. 24
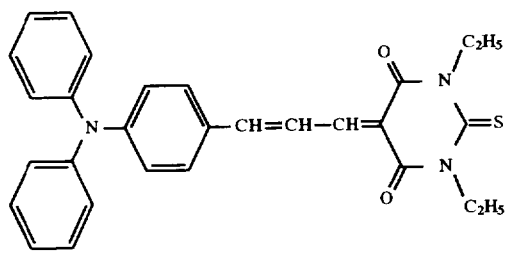 No. 25
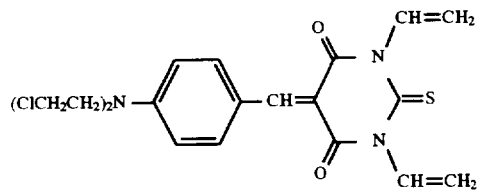 No. 26
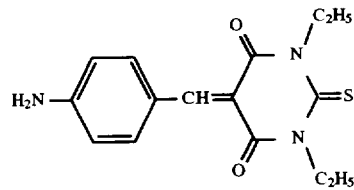 No. 27
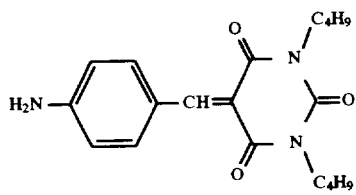 No. 28
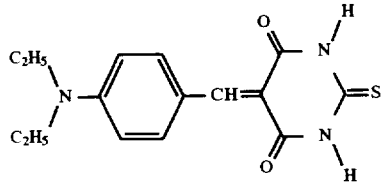 No. 29
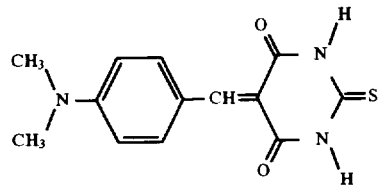 No. 30
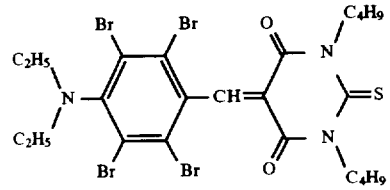 No. 31
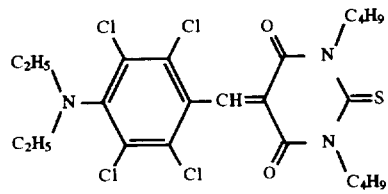 No. 32
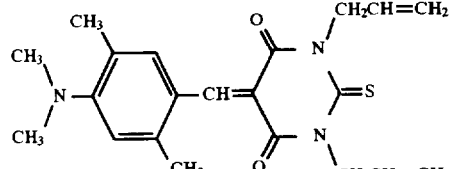 No. 33
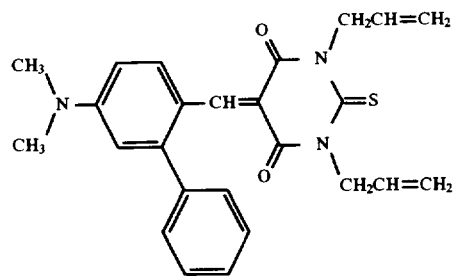 No. 34
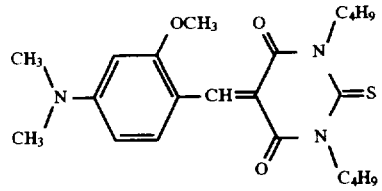 No. 35

-continued

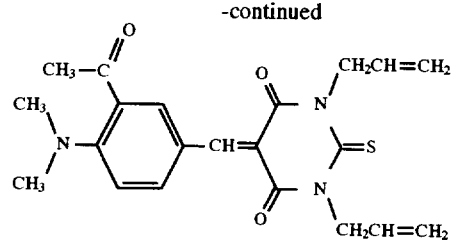
No. 36

The sensitizing dye represented by formula (I) can be easily synthesized from the compound represented by the following formula (VI) or (VII):

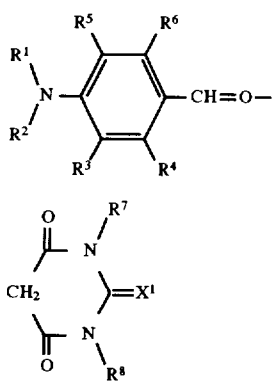

wherein $R^1$ to $R^8$ each has the same meaning as defined in formula (I).

These sensitizing dyes may be used either individually or in combination of two or more thereof. The added amount of the sensitizing dye is generally from 0.05 to 30 parts by weight, preferably from 0.1 to 20 parts by weight, more preferably from 0.2 to 10 parts by weight, per 100 parts by weight of the compound having an ethylenically unsaturated double bond.

The titanocene compound used as the photopolymerizable initiation system in the present invention may be any if it is a titanocene compound capable of generating active radicals on irradiation of light in the presence of the above-described sensitizing dye together and may be appropriately selected from known compounds described, for example, in JP-A-59-152396 and JP-A-61-151197.

More specific examples of the titanocene compound include dicyclopentadienyl-Ti-dichloride, dicyclopentadienyl-Ti-bisphenyl, dicyclopentadienyl-Ti-bis-2,3,4,5,6-pentafluorophen-1-yl (hereinafter, sometimes referred to as "A-1"), dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-bis-2,6-difluorophen-1-yl, dicyclopentadienyl-Ti-bis-2,4-difluorophen-1-yl,dimethylcyclopentadienyl-Ti-bis-2,3,4,5,6-pentafluorophen-1-yl (hereinafter, sometimes referred to as "A-2"), dimethylcylopentadienyl-Ti-bis-2,3,5,6-tetrafluorophen-1-yl, dimethylcyclopentadienyl-Ti-bis-2,4-difluorophen-1-yl and bis(cyclopentadienyl)-bis(2,6-difluoro-3-(pyr-1-yl)phenyl)titanium (hereinafter, sometimes referred to as "A-3").

The titanocene compounds for use in the photopolymerizable composition of the present invention may be used individually or in combination of two or more thereof.

The added amount of the titanocene compound is generally from 0.5 to 100 parts by weight, preferably from 1 to 80 parts by weight, more preferably from 2 to 50 parts by weight, per 100 parts by weight of the compound having an ethylenically unsaturated double bond.

The photopolymerizable composition of the present invention may contain, in addition to the above-described sensitizing dye and titanocene compound, compound (a), (b), (c), (d), (e), (f), (g) or (h), which will be described below, so as to improve sensitivity.

Compound (a) having a carbon-halogen bond preferably includes the following compounds:

a compound represented by the following formula (VIII):

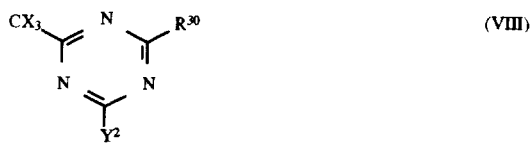

wherein X represents a halogen atom, $Y^2$ represents $-CX_3$, $-NH_2$, $-NHR^{31}$, $-NR^{31}_2$ or $-OR^{31}$ (wherein $R^{31}$ represents an alkyl group, a substituted alkyl group, an aryl group or a substituted aryl group), and $R^{30}$ represents $-CX_3$, an alkyl group, a substituted alkyl group, an aryl group, a substituted aryl group or a substituted alkenyl group;

a compound represented by the following formula (IX):

wherein $R^{32}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, X represents a halogen atom, and k represents an integer of from 1 to 3;

a compound represented by the following formula (X):

wherein $R^{33}$ represents an aryl group or a substituted aryl group, $R^{34}$ represents $-CO-NR^{35}R^{36}$ (wherein $R^{35}$ and $R^{36}$ each represents an alkyl group, a substituted alkyl group, an alkenyl group, a substituted alkenyl group, an aryl group or a substituted aryl group), an oxadiazolyl group represented by the following formula:

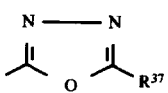

(wherein $R^{37}$ has the same meaning as $R^{32}$ in formula (IX)) or a halogen atom, $Z^3$ represents $-CO-$, $-CS-$ or $-SO_2-$, and m represents 1 or 2;

a compound represented by the following formula (XI):

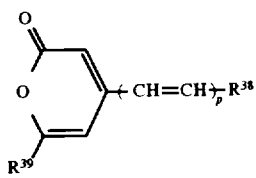

wherein $R^{38}$ represents an aryl group or a heterocyclic group, which may be substituted, $R^{39}$ represents a trihaloalkyl or trihaloalkenyl group containing an alkyl or alkenyl group having from 1 to 3 carbon atoms, and p represents 1, 2 or 3;

a carbonylmethylene heterocyclic compound having a trihalogenomethyl group represented by the following formula (XII):

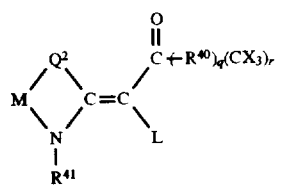

wherein L represents a hydrogen atom or a substituent represented by the formula: CO—$(R^{40})_q(CX_3)_r$, M represents a substituted or unsubstituted alkylene or arylene group, $Q^2$ represents a sulfur atom, a selenium atom, an oxygen atom, a dialkylmethylene group, an alken-1,2-ylene group, a 1,2-phenylene group or an N—$R^{41}$ group. M and $Q^2$ may be combined to form a 5- or 6-membered ring together with the carbon atom and the nitrogen atom. $R^{40}$ represents a carbocyclic or heterocyclic aromatic group. $R^{41}$ represents an alkyl group, an aralkyl group or an alkoxyalkyl group, X represents a halogen atom such as chlorine, bromine or iodine, and q=0 and r=1 or q=1 and r=1 or 2;

a 4-halogeno-5-(halogenomethylphenyl)oxazole derivative represented by the following formula (XIII):

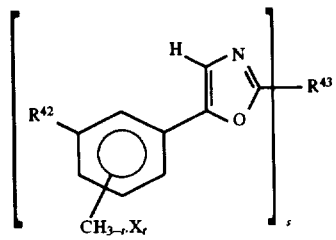

wherein X represents a halogen atom, t represents an integer of from 1 to 3, s represents an integer of from 1 to 4, $R^{42}$ represents a hydrogen atom or a $CH_{3-t}X_t$ group, and $R^{43}$ represents an s-valent unsaturated organic group which may be substituted; and a 2-(halogenomethylphenyl)-4-halogenooxazole derivative represented by the following formula (XIV):

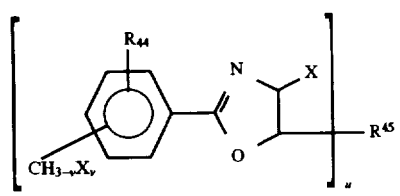

wherein X represents a halogen atom, v represents an integer of from 1 to 3, u represents an integer of from 1 to 4, $R^{44}$ represents a hydrogen atom or a $CH_{3-v}X_v$ group, and $R^{45}$ represents a u-valent unsaturated organic group which may be substituted.

Examples of the above-described compounds having a carbon-halogen bond include:

compounds described in Wakabayashi et al. *Bull. Chem. Soc. Japan*, 42, 2924 (1969) such as 2-phenyl-4,6-bis(tri-chloromethyl)-S-triazine, 2-(p-chlorophenyl)-4,6-bis(trichloromethyl)-S-triazine, 2-(p-tolyl)-4,6-bis(tri-chloromethyl)-S-triazine, 2-(p-methoxyphenyl)-4,6-bis (trichloromethyl)-S-triazine, 2-(2',4'-dichlorophenyl)-4,6-bis(trichloromethyl)-S-triazine, 2,4,6-tris (trichloromethyl)-S-triazine, 2-methyl-4,6-bis (trichloromethyl)-S-triazine, 2-n-nonyl-4,6-bis (trichloromethyl)-S-triazine and 2-(α,α,β,-trichloroethyl)-4,6-bis (trichloromethyl)-S-triazine;

compounds described in British Patent 1,388,492 such as 2-styryl-4,6-bis(trichloromethyl)-S-triazine, 2-(p-methylstyryl)-4,6-bis(trichloromethyl)-S-triazine, 2-(p-methoxystyryl)- 4,6-bis(trichloromethyl)-S-triazine and 2-(p-methoxystyryl)-4-amino-6-trichloromethyl-S-triazine;

compounds described in JP-A-53-133428 such as 2-(4-methoxynaphtho-1-yl)-4,6-bistrichloromethyl-S-triazine, 2-(4-ethoxynaphtho-1-yl)-4,6-bistrichloromethyl-S-triazine, 2-|4-(2-ethoxyethyl) naphtho-1-yl|-4,6-bistrichloromethyl-S-triazine, 2-(4 7-dimethoxynaphtho-1-yl|-4,6-bistrichloromethyl-S-triazine and 2-(acenaphtho-5-yl)-4,6 bistrichloromethyl-S-triazine;

compounds described in German Patent 3,337,024 as se forth below:

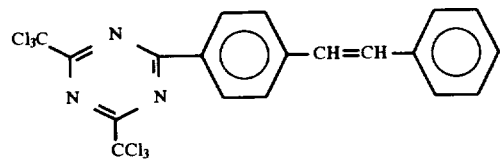

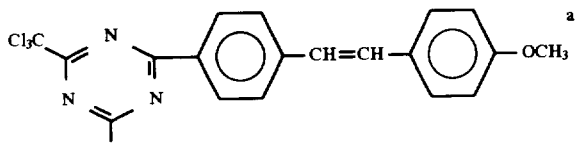

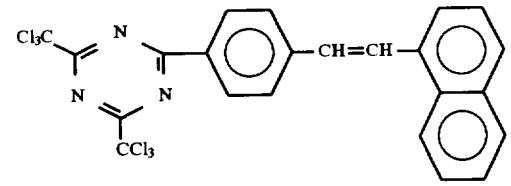

-continued

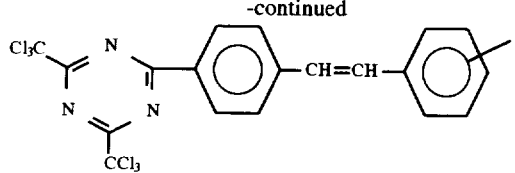 a-4

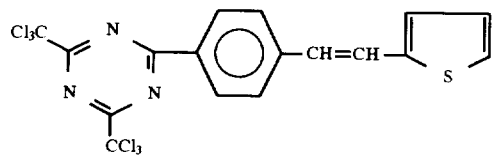 a-5

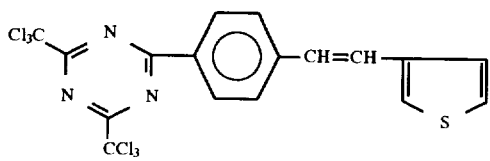 a-6

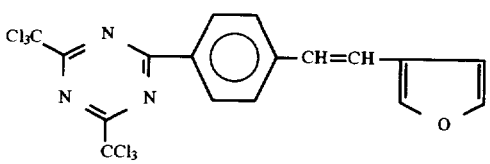 a-7

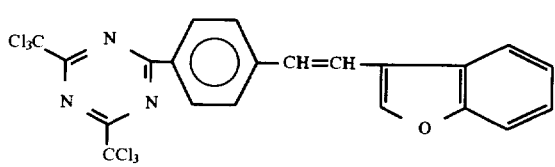 a-8 compounds described in F. C. Schaefer et al, *J. Org. Chem.*, 29, 1527 (1964) such as 2-methyl-4,6-bis(tribromomethyl)-S-triazine, 2,4,6-tris(tribromomethyl)-S-triazine, 2,4,6-tris(dibromomethyl)-S-triazine, 2-amino-4-methyl-6-tribromomethyl-S-triazine and 2-methoxy-4-methyl-6-trichloromethyl-S-triazine;

compounds described in JP-A-62-58241 as set forth below:

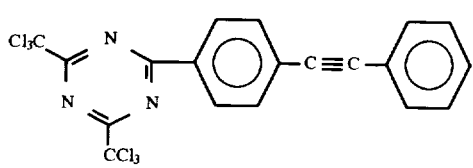 a-9

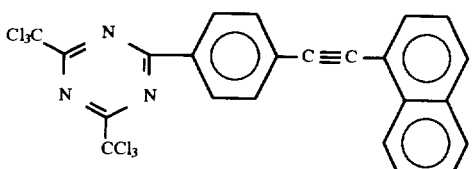 a-10

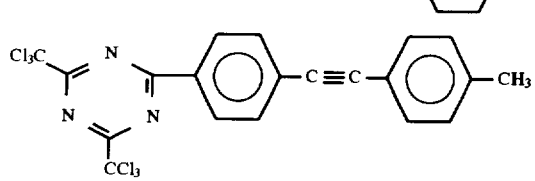 a-11

-continued

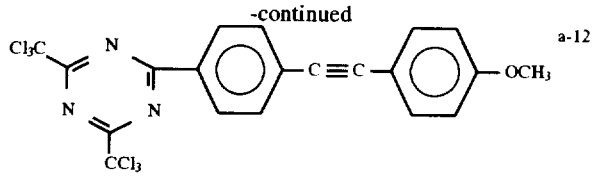 a-12

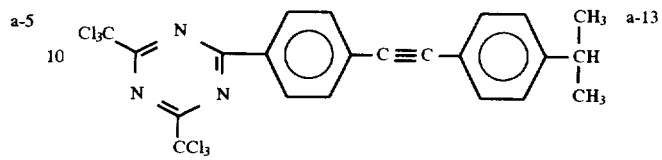 a-13

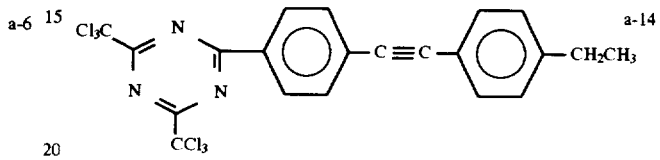 a-14 compounds described in JP-A-5-281728 as set forth below:

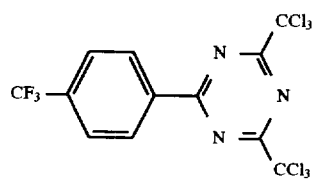 a-15

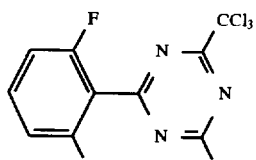 a-16

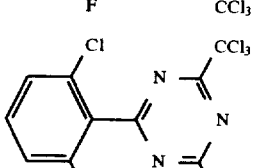 a-17

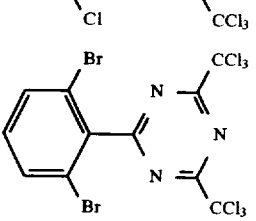 a-18 compounds as set forth below, which can be easily synthesized by one skilled in the art according to the synthesis method described in M. P. Hutt, E. F. Elslager and L. M. Werbel, *Journal of Heterocyclic Chemistry*, vol. 7 (No. 3), page 511 et seq (1970):

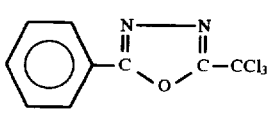 a-19

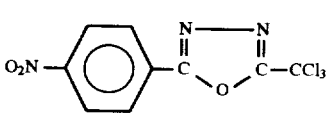 a-20

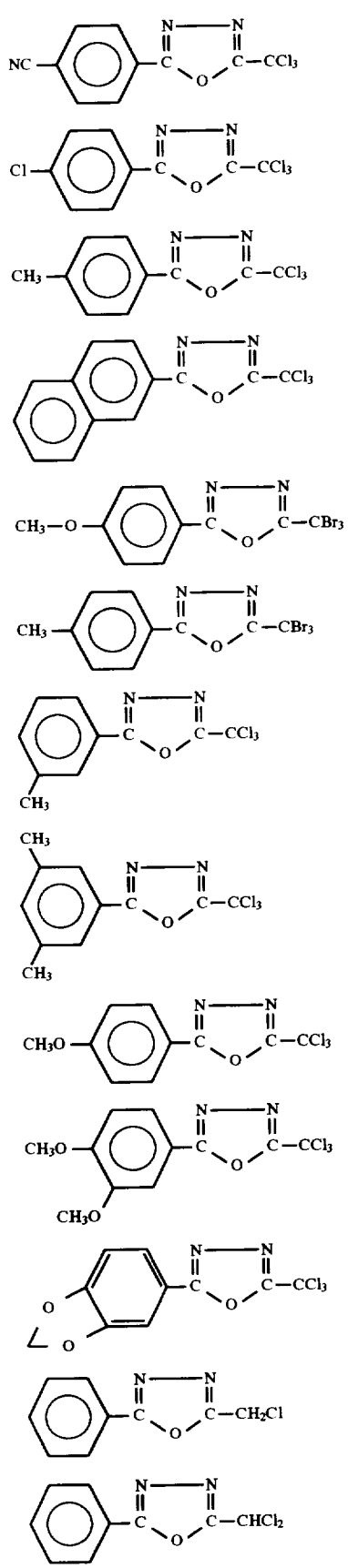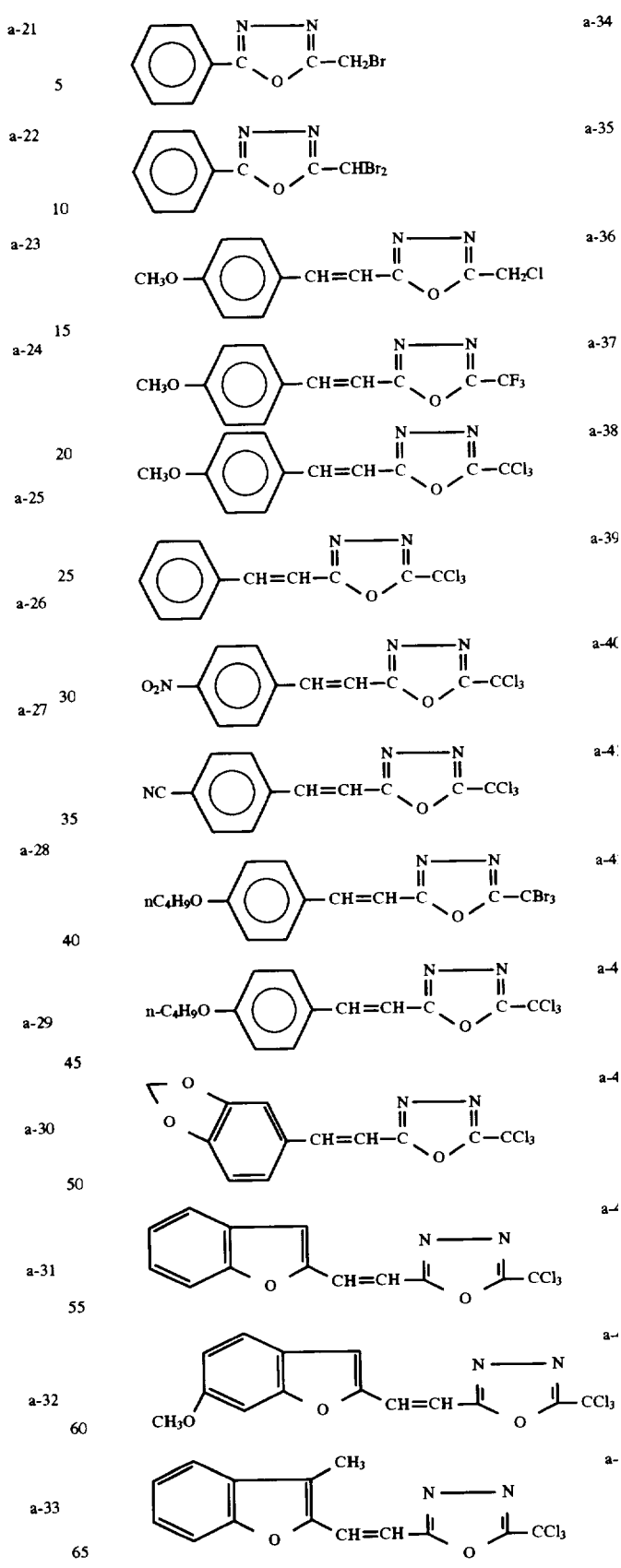

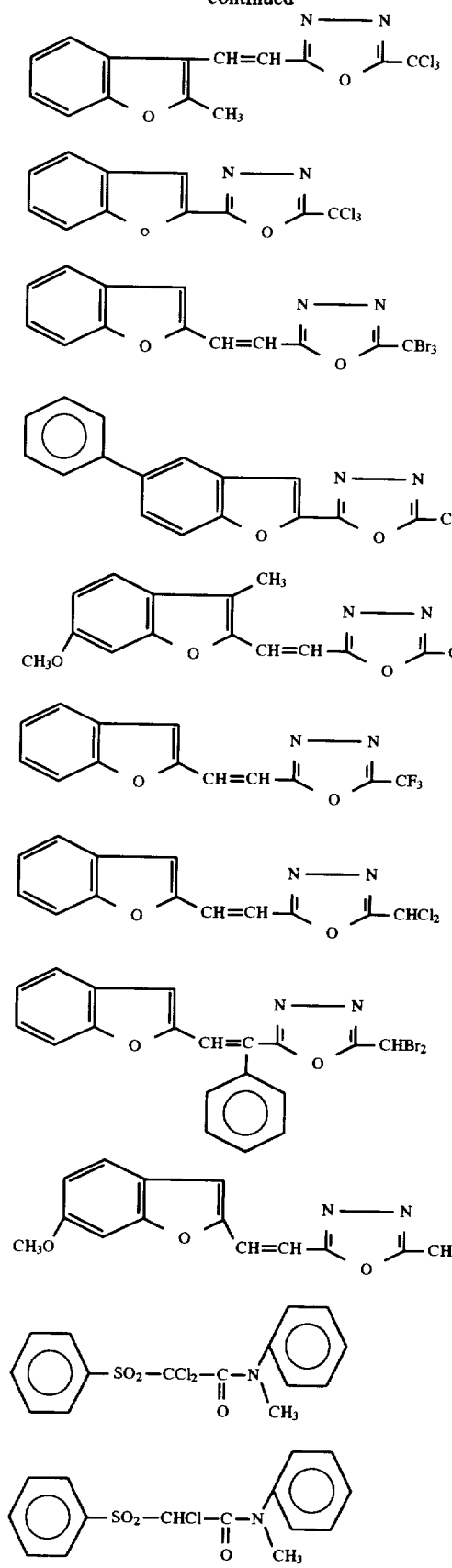
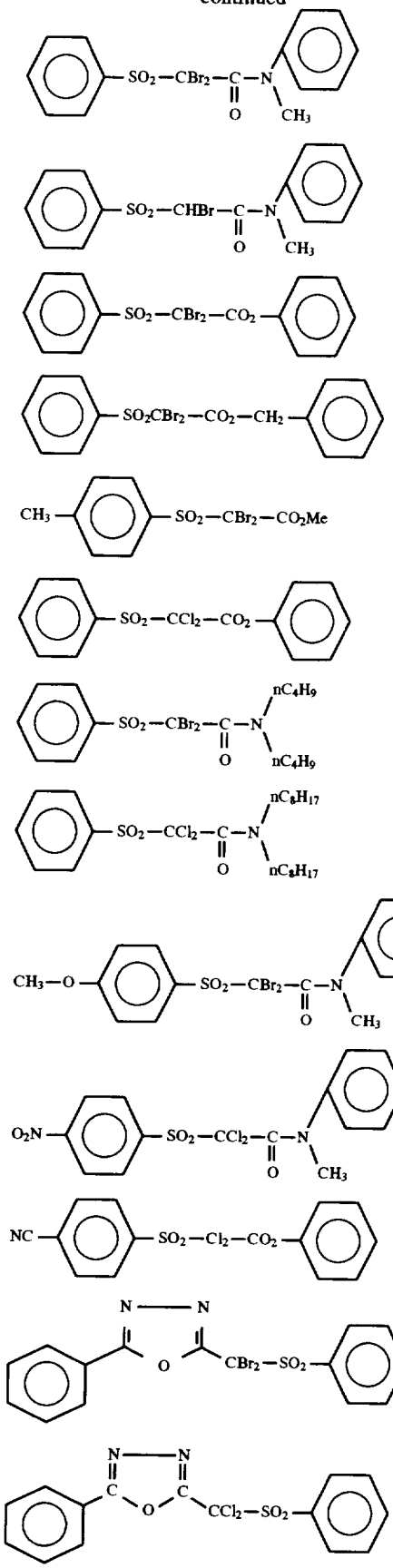

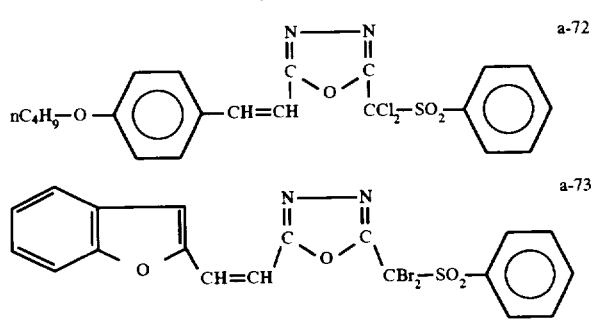

a-72 a-73 compounds described in German Patent 2,641,100 such as 4-(4-methoxystyryl)-6-(3,3,3-trichloropropenyl)-2-pyrone and 4-(3,4,5-trimethoxystyryl)-6-trichloromethyl-2-pyrone;

compounds described in German Patent 3,333,450 as set forth below:

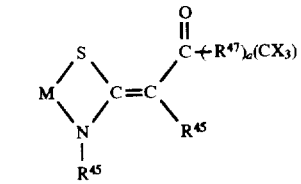

wherein $R^{47}$=a benzene ring, and a=0 or 1.

| | $R^{48}$ | M | $R^{46}$ | a | $CX_3$ |
|---|---|---|---|---|---|
| a-74 | $C_2H_5$ | 1,2-phenylene | H | 1 | 4-$CCl_3$ |
| a-75 | $CH_2C_6H_5$ | 1,2-phenylene | H | 1 | 4-$CCl_3$ |
| a-76 | $C_2H_5$ | 1,2-phenylene | H | 1 | 3-$CCl_3$ |
| a-77 | $C_2H_5$ | 1,2-phenylene | H | 1 | 4-$CF_3$ |
| a-78 | $C_2H_5$ | 5-$CH_3$-1,2-phenylene | H | 0 | $CCl_3$ |
| a-79 | $CH_2C_6H_5$ | 1,2-phenylene | H | 0 | $CCl_3$ |
| a-80 | $C_2H_4OCH_3$ | 1,2-phenylene | H | 1 | 4-$CCl_3$ | compounds described in German Patent 3,021,590 as set forth below:

| | $R^{49}$ | X |
|---|---|---|
| a-81 | phenyl | Cl |
| a-82 | 4-methoxyphenyl | Cl |
| a-83 | 4-cyanophenyl | Cl |
| a-84 | (see structure below) | |
| a-85 | (see structure below) | | compounds described in German Patent 3,021,599 as set forth below:

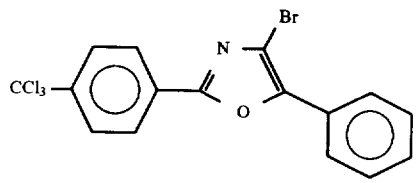  a-86

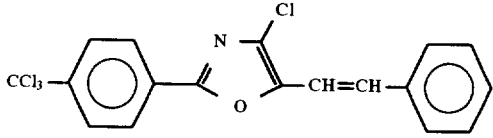  a-87

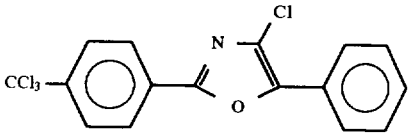  a-88

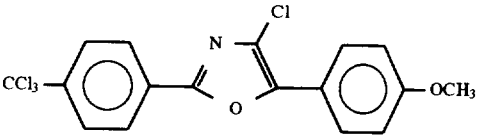  a-89

The ketone compound represented by formula (II) as component (b) for use in the present invention is described below. In formula (II), $R^{10}$ and $R^{11}$ each represents a hydrogen atom or an alkyl group having from 1 to 8 carbon atoms, or $R^{10}$ and $R^{11}$ may be combined with each other to form a ring together with the carbon atom as in Compound b-6 exemplified below, and examples of the ring include cyclohexane and cyclohexanone. The ring formed by $R^{10}$, $R^{11}$ and the carbon atom may be a divalent group linking the carbonyl group and the morpholino group, and examples of the divalent group include a p-phenylene group as in Compound b-10 exemplified below.

Ar represents an aromatic group represented by the formula described above, and $R^{12}$, $R^{13}$, $R^{14}$, $R^{15}$ and $R^{16}$ each independently represents a hydrogen atom, a halogen atom, an alkyl group having from 1 to 12 carbon atoms, an alkenyl group having from 3 to 12 carbon atoms, an aryl group, an alkoxy group having from 1 to 12 carbon atoms, a hydroxyl group, $-S-R^{18}$, $-SO-R^{18}$ or $-SO_2-R^{18}$ (wherein $R^{18}$ represents a hydrogen atom, an alkyl group or an alkenyl group).

$R^{17}$ represents a hydrogen atom, an alkyl group having from 1 to 12 carbon atoms or an acyl group having from 2 to 13 carbon atoms.

These alkyl, aryl, alkoxy, alkenyl, and acyl groups each may further be substituted by a substituent having from 1 to 6 carbon atoms.

$L^1$ represents a bond or an alkylene group (e.g., ethylene, ethyldiethtylaminoethylene). When $L_1$ is a bond, at least one of $R^{12}$ to $R^{16}$ is $-S-R^{18}$ or $-SO-R^{18}$.

$Y^1$ represents a hydrogen atom or a substituted carbonyl group represented by the formula described above, and in the formula, $R^{10}$ and $R^{11}$ have the same meanings as defined above.

Specific examples of the ketone compound include the following compounds described in U.S. Pat. No. 4,318,791 and European Unexamined Patent Publication 0284561A:

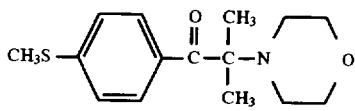  b-1

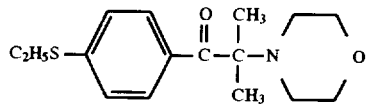  b-2

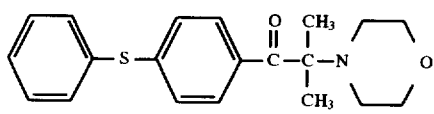  b-3

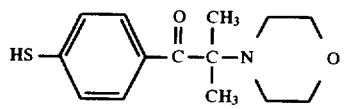  b-4

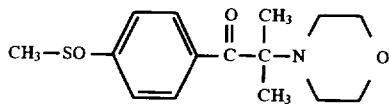  b-5

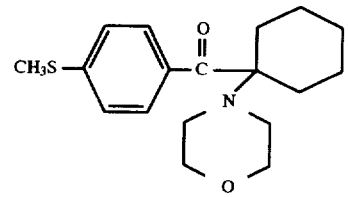  b-6

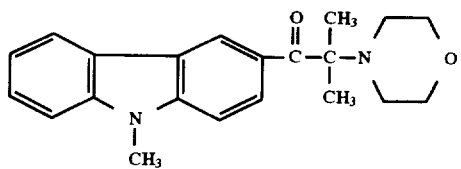  b-7

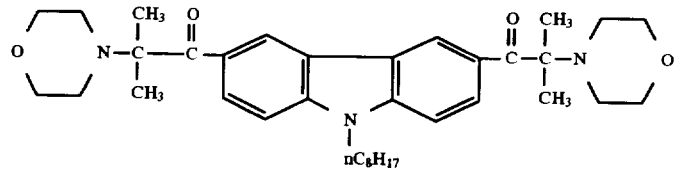  b-8

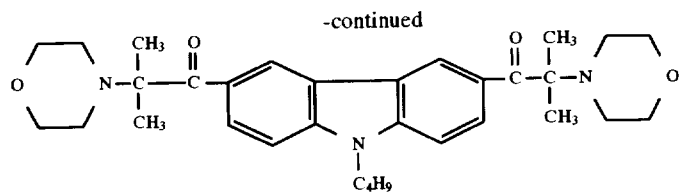

b-9

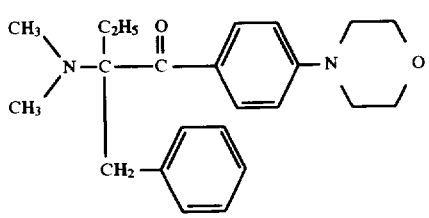

b-10

The ketoxime compound represented by formula (III) as component (c) for use in the present invention is described below.

In formula (III), $R^{19}$ and $R^{20}$, which may be the same or different, each represents an aliphatic hydrocarbon, an aromatic hydrocarbon group or a heterocyclic group, which may have a substituent or may contain an unsaturated bond. Specific examples of $R^{19}$ and $R^{20}$ include an allyl group, a phenylmethyl group, an n-butyl group, an n-dodecyl group, a 2-methoxyethoxyethyl group, a 4-methoxycarbonylphenylmethyl group, a methoxycarbonylmethyl group, an ethoxycarbonylmethyl group, a 4-methoxycarbonylbutyl group, a 2-methoxycarbonylethyl group, a 3-methoxycarbonylallyl group, a benzyloxycarbonylmethyl group, a 4-methoxyphenyl group, a 4-methylthiophenyl group and a 4-morpholinophenyl group.

$R^{21}$ and $R^{22}$, which may be the same or different, each represents a hydrogen atom, an aliphatic or aromatic hydrocarbon group which may have a substituent or may contain an unsaturated bond, a heterocyclic group, a hydroxyl group, a substituted oxy group, a mercapto group or a substituted thio group, and specific examples of $R^{21}$ and $R^{22}$ include a methyl group.

$R^{23}$ and $R^{24}$ each represents a hydrogen atom, an aliphatic or aromatic hydrocarbon group which may have a substituent or may contain an unsaturated bond, or a substituted carbonyl group. Or, $R^{23}$ and $R^{24}$ may be combined with each other to form a ring, and the ring may contain at least one of —O—, —NR$^{23}$—, —O—CO—, —NH—CO—, —S— and —SO$_2$— in the linking main chain and has from 2 to 8 carbon atoms.

Specific examples of $R^{23}$ and $R^{24}$ include a methyl group and specific examples of the ring formed by $R^{23}$ and $R^{24}$ include a morpholine ring.

Specific examples of compound (c) include the following compounds but the present invention is by no means limited thereto.

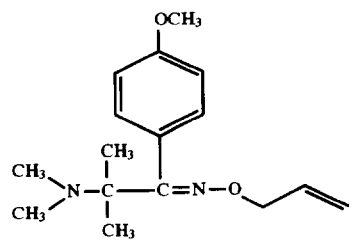

c-1

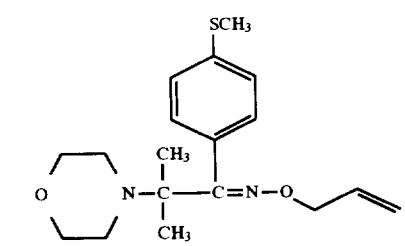

c-2

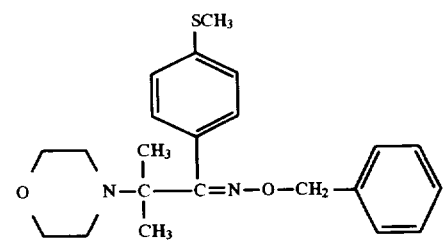

c-

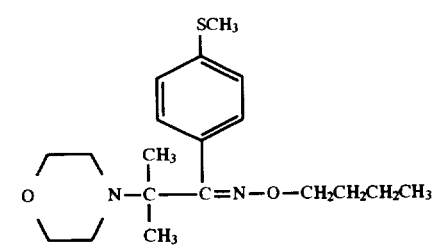

c-

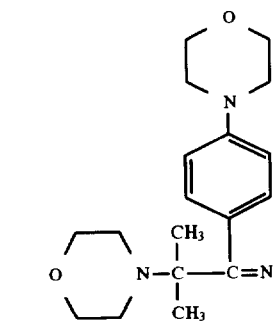

c

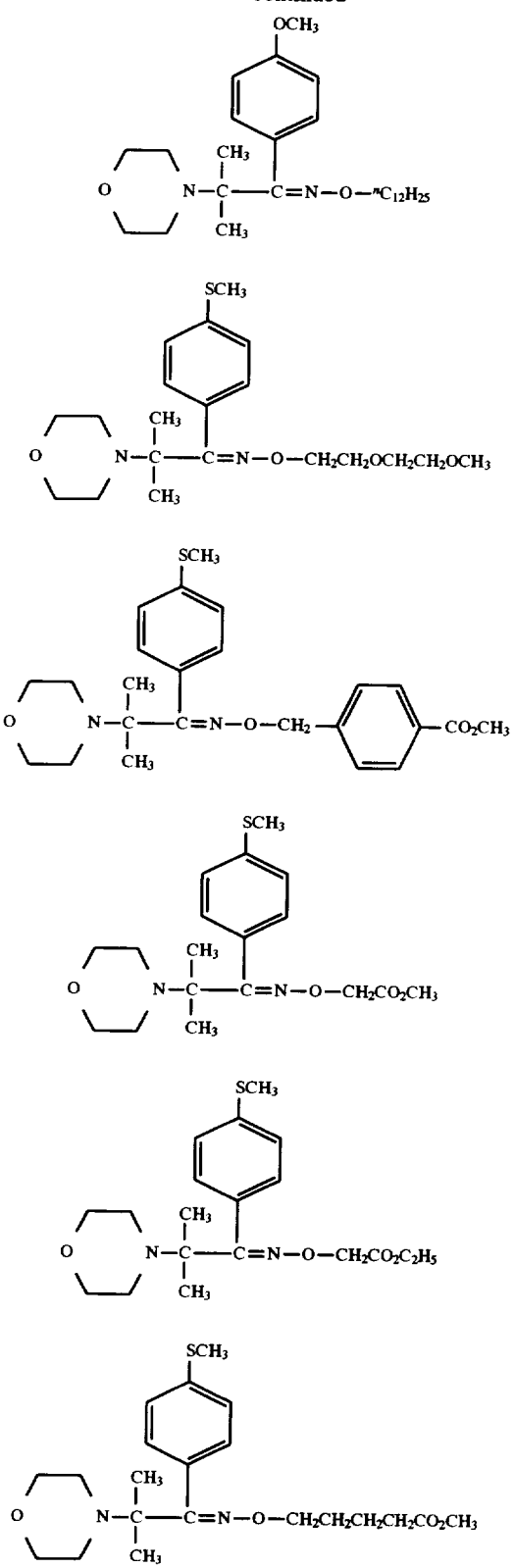

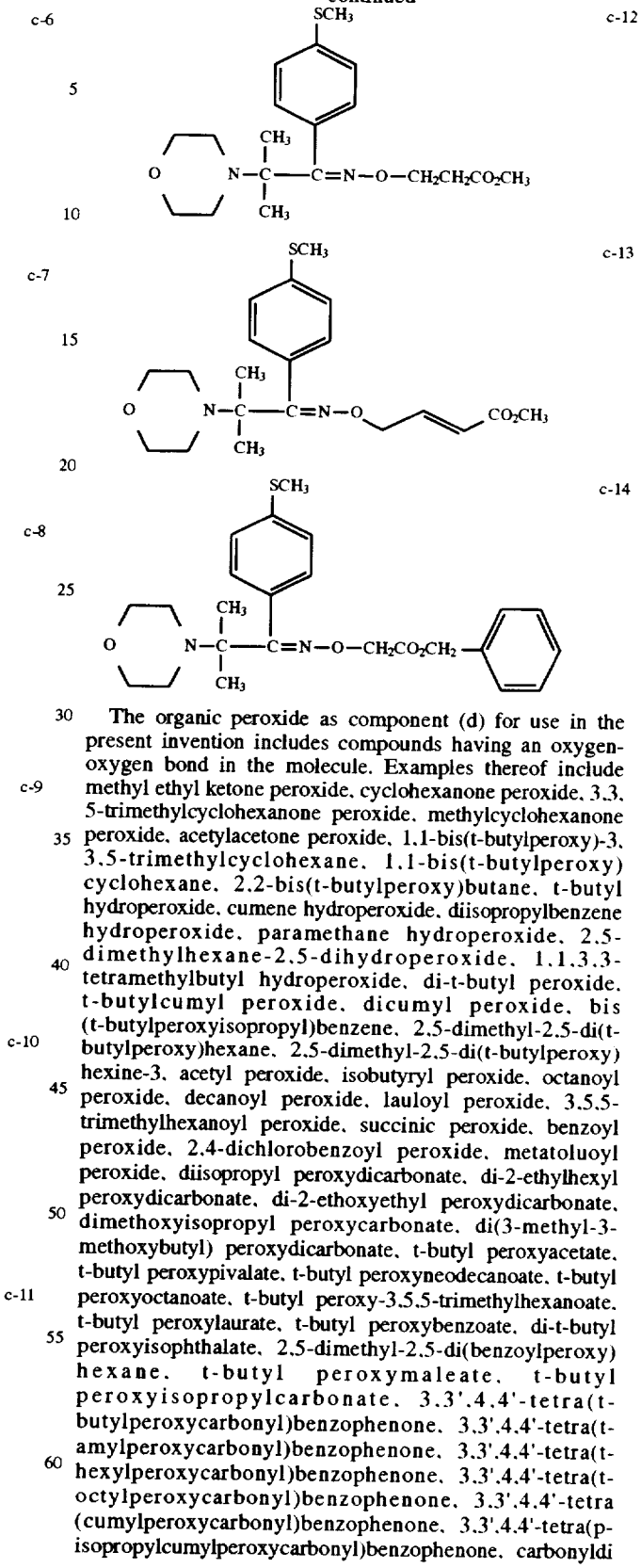

The organic peroxide as component (d) for use in the present invention includes compounds having an oxygen-oxygen bond in the molecule. Examples thereof include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 2,2-bis(t-butylperoxy)butane, t-butyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2,5-dimethyl-2,5-di(t-butylperoxy)hexine-3, acetyl peroxide, isobutyryl peroxide, octanoyl peroxide, decanoyl peroxide, lauloyl peroxide, 3,5,5-trimethylhexanoyl peroxide, succinic peroxide, benzoyl peroxide, 2,4-dichlorobenzoyl peroxide, metatoluoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, t-butyl peroxyacetate, t-butyl peroxypivalate, t-butyl peroxyneodecanoate, t-butyl peroxyoctanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleate, t-butyl peroxyisopropylcarbonate, 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, carbonyldi (t-butylperoxy dihydrogen diphthalate) and carbonyldi(t-hexylperoxy dihydrogen diphthalate).

Among these, preferred are peroxide esters such as 3,3',4,4'-tetra(t-butylperoxycarbonyl)benzophenone (hereinafter, sometimes referred to as "d-1"), 3,3',4,4'-tetra(t-amylperoxycarbonyl)benzophenone, 3,3',4,4'-tetra(t-hexylperoxycarbonyl)benzophenone, 3,3',4,4'-tetraoctylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-t-butyl diperoxyisophthalate.

The thio compound as component (e) for use in the present invention is represented by formula (IV) (described above).

In formula (IV), $R^{25}$ represents an alkyl group or an aryl group and $R^{26}$ represents a hydrogen atom or an alkyl group. The alkyl group represented by $R^{25}$ or $R^{26}$ is preferably an alkyl group having from 1 to 4 carbon atoms. The aryl group represented by $R^{25}$ is preferably an aryl group having from 6 to 10 carbon atoms, such as phenyl and naphthyl, and the substituted aryl group includes the above-described aryl group substituted by a halogen atom such as chlorine, an alkyl group such as methyl, or an alkoxy group such as methoxy or ethoxy. $R^{25}$ and $R^{26}$ may be combined with each other to provide an atomic group necessary for completing a heterocyclic ring which may have a condensed ring, together with the carbon atom and the nitrogen atom. In this case, examples of the condensed ring include a benzene ring.

Specific examples of the thio compound represented by formula (IV) are set forth below. In the following, formula (IV) is again presented and specific examples are shown by the combinations of $R^{25}$ or the like in formula (IV).

| | $R^{25}$—NH \| $R^{26}$—C=S | or | $R^{25}$—N \|\| $R^{26}$—C—SH | (IV) |
|---|---|---|---|---|
| | $R^{25}$ | | $R^{26}$ | |
| e-1 | H | | H | |
| e-2 | H | | $CH_3$ | |
| e-3 | $CH_3$ | | H | |
| e-4 | $CH_3$ | | $CH_3$ | |
| e-5 | $C_6H_5$ | | $C_2H_5$ | |
| e-6 | $C_6H_5$ | | $C_4H_9$ | |
| e-7 | $C_6H_4Cl$ | | $CH_3$ | |
| e-8 | $C_6H_4Cl$ | | $C_4H_9$ | |
| e-9 | $C_6H_4$—$CH_3$ | | $C_4H_9$ | |
| e-10 | $C_6H_4$—$OCH_3$ | | $CH_3$ | |
| e-11 | $C_6H_4$—$OCH_3$ | | $C_2H_5$ | |
| e-12 | $C_6H_4$—$OC_2H_5$ | | $CH_3$ | |
| e-13 | $C_6H_4$—$OC_2H_5$ | | $C_2H_5$ | |
| e-14 | $C_6H_4$—$OCH_3$ | | $C_4H_9$ | |
| e-15 | —(CH$_2$)$_3$— | | | |
| e-16 | —(CH$_2$)$_2$S— | | | |
| e-17 | —CH(CH$_3$)—CH$_2$—S— | | | |
| e-18 | —CH$_2$—CH(CH$_3$)—S— | | | |
| e-19 | —C(CH$_3$)$_2$—CH$_2$—S— | | | |
| e-20 | —CH$_2$—C(CH$_3$)$_2$—S— | | | |
| e-21 | —(CH$_2$)$_2$O— | | | |
| e-22 | —CH(CH$_3$)—CH$_2$—O— | | | |
| e-23 | —C(CH$_3$)$_2$—CH$_2$—O— | | | |
| e-24 | —CH=CH—N(CH$_3$)— | | | |
| e-25 | —(CH$_2$)$_3$S— | | | |
| e-26 | —(CH$_2$)$_2$CH(CH$_3$)—S— | | | |
| e-27 | —(CH$_2$)$_3$O— | | | |
| e-28 | —(CH$_2$)$_5$— | | | |
| e-29 | —C$_6$C$_4$—O— | | | |
| e-30 | —N=C(SCH$_3$)—S— | | | |
| e-31 | —C$_6$H$_4$—NH— | | | |
| e-32 | 4-Cl-phenyl-O— | | | |
| e-33 | 4-CH$_3$O-phenyl-NH— | | | |
| e-34 | 4-CH$_3$-phenyl-NH— | | | |
| e-35 | 3,4-(CH$_3$)$_2$-phenyl-NH— | | | |
| e-36 | 4-($C_5H_{11}$CONH)-phenyl-NH— | | | |
| e-37 | 4-Cl-phenyl-NH— | | | |
| e-38 | naphthyl-NH— | | | |
| e-39 | Et$_2$N-phenyl=N— | | | |
| e-40 | ($C_5H_{11}$-C(=O)-NH)-phenyl-S— | | | |
| e-41 | phenyl-S— | | | |
| e-42 | 4-Cl-phenyl-S— | | | |

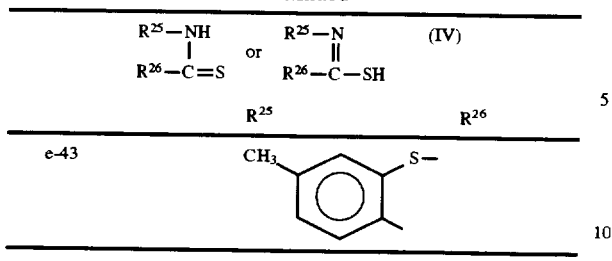

Examples of the hexaarylbiimidazole as component (f) for use in the present invention include 2,2'-bis(o-chlorophenyl)-4,4',5,5'-tetraphenylbiimidazole (hereinafter, sometimes referred to as "f-1"), 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole. Examples of the ketoxime ester include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one.

The aromatic onium salt as component (g) for use in the present invention includes aromatic onium salts of elements belonging to Groups 15(5B), 16(6B) and 17(7B) of the Periodic Table, specifically, onium salts of N, P, As, Sb, Bi, O, S, Se, Te and I. Examples of the aromatic onium salt include the compounds described in JP-B-52-14277, JP-B-52-14278 and JP-B-52-14279. Specific examples thereof are set forth below.

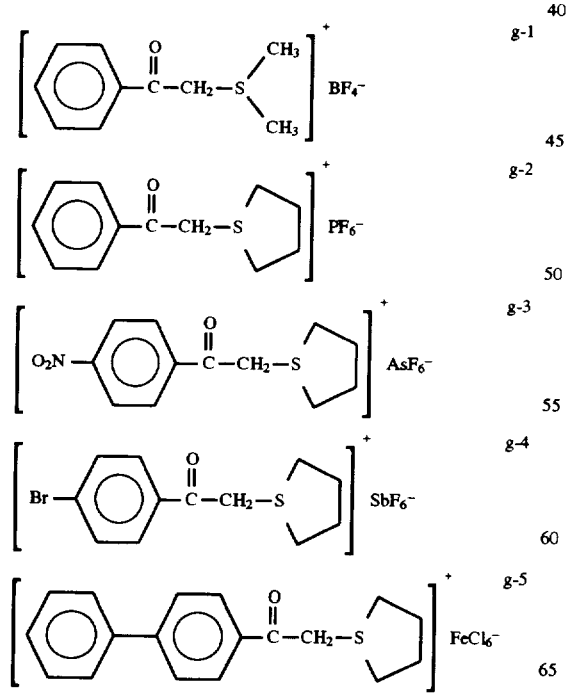

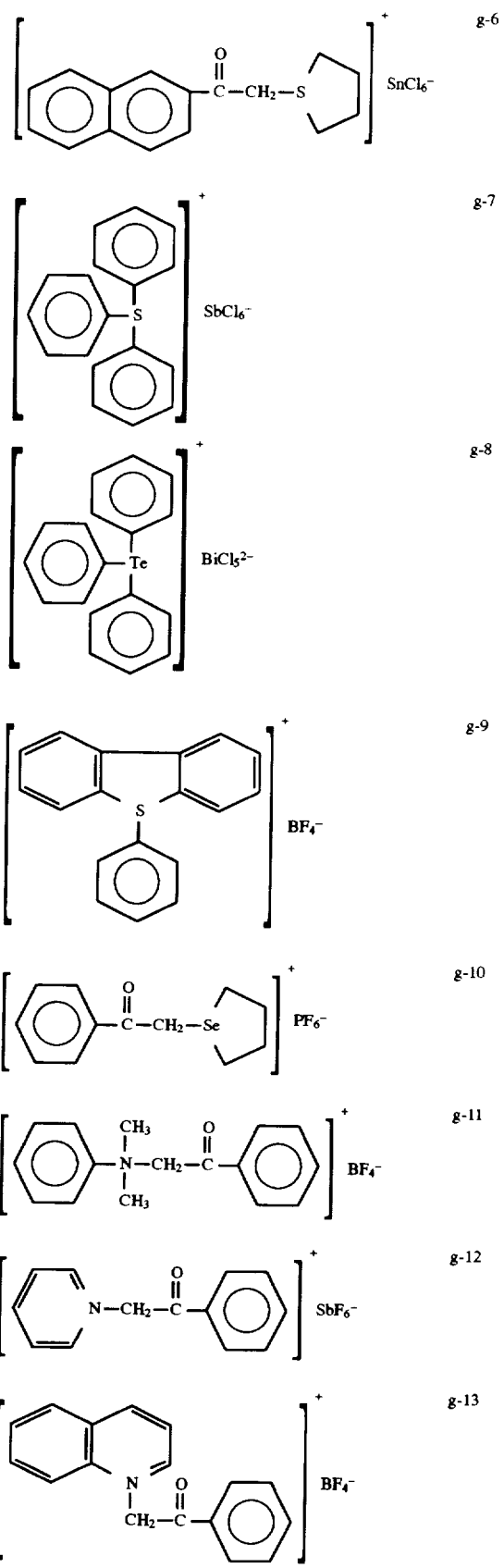

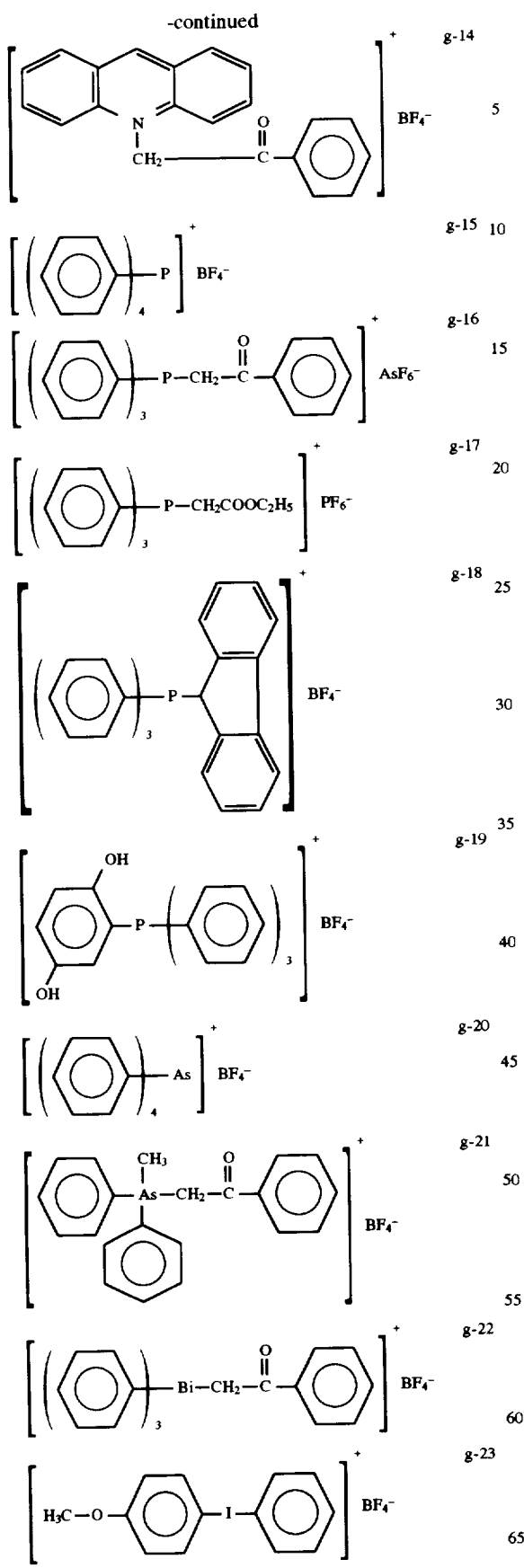
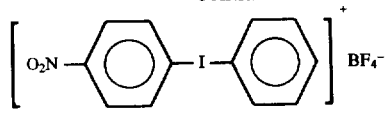
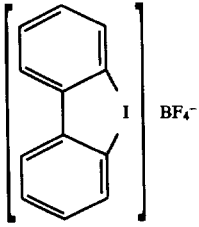
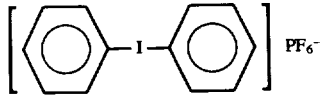
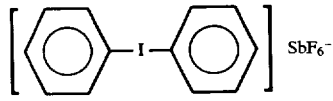

Among these, preferred are compounds of BF$_4$ salt and PF$_6$ salt, more preferred are a BF$_4$ salt and a PF$_6$ salt of aromatic iodonium salt.

Examples of the ketoxime ester as component (h) for use in the present invention include 3-benzoyloxyiminobutan-2-one (hereinafter, sometimes referred to as "h-1"), 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one.

These additives (a) to (h) may be used individually or in combination of two or more thereof. The use amount is suitably from 0.05 to 100 parts by weight, preferably from 1 to 80 parts by weight, more preferably from 3 to 50 parts by weight, per 100 parts by weight of the compound having an ethylenically unsaturated double bond.

The composition of the present invention contains the above-described photopolymerization initiation system usually in a low concentration. If the system is contained in an excessively high concentration, disadvantageous results come out such as cutting of effective light rays. The photopolymerization initiation system of the present invention i.e., the total amount of the sensitizing dye of formula (I), the titanocene compound and compounds (a) to (h), is preferably used in an amount of from 0.01 to 60 wt %, more preferably from 1 to 30 wt %, based on the total amount of the photopolymerizable compound having an ethylenically unsaturated double bond and a linear organic high molecular polymer which is added if desired.

The photopolymerizable composition of the present invention preferably contains a linear organic high molecular polymer as a binder. The "linear organic high molecular polymer" may be any compound as long as it is a linear organic high molecular polymer having compatibility with the photopolymerizable ethylenically unsaturated compound. Preferably, a water- or alkalescent water-soluble or swellable linear organic high molecular polymer capable of water development or alkalescent water development selected. The linear organic high molecular polymer is used not only as a film forming agent of the composition but also as a water, alkalescent water or organic solvent develop which is appropriately selected depending on the use. For example, when a water-soluble organic high molecular polymer is used, water development can be performed. This kind of linear organic high molecular polymer includes an addition polymer having a carboxylic acid group on the side chain and examples thereof include a methacrylic acid copolymer, an acrylic acid copolymer, an itaconic acid copolymer, a crotonic acid copolymer, a maleic acid copolymer and a partially esterified maleic acid copolymer, described in JP-A-59-44615, JP-B-54-34327, JP-B-58-12577, JP-B-54-25957, JP-A-54-92723, JP-A-59-53836 and JP-A-59-71048. Further, an acidic cellulose derivative similarly having a carboxylic acid group on the side chain is included. An addition product of a cyclic acid anhydride to an addition polymer having a hydroxyl group is also useful.

Among these, a benzyl (meth)acrylate/(meth)acrylic acid/other addition polymerizable vinyl monomer, if desired copolymer and an allyl (meth)acrylate/(meth)acrylic acid/other addition polymerizable vinyl monomer, if desired copolymer are preferred. In addition, polyvinyl pyrrolidone and polyethylene oxide are useful as the water-soluble linear organic polymer. Further, an alcohol-soluble nylon and a polyether of 2,2-bis(4-hydroxyphenyl)propane with epichlorohydrin are also useful so as to increase the strength of the cured film. It is preferred that the linear organic high molecular polymer has a weight-average molecular weight of from 5,000 to 1,000,000, more preferably from 10,000 to 200,000. The above-described linear organic high molecular polymer can be mixed into the entire composition in any arbitrary amount. However, if the mixing amount exceeds 90 wt %, disadvantageous results may come out in view of the strength of an image formed or the like. The mixing amount is preferably from 30 to 85 wt %. The weight ratio of the photopolymerizable compound having an ethylenically unsaturated double bond to the linear organic high molecular polymer is preferably from 1/9 to 7/3, more preferably from 3/7 to 5/5.

In the present invention, other than the above-described fundamental components, a slight amount of a thermal polymerization inhibitor is preferably added so as to prevent unnecessary thermal polymerization of the polymerizable compound having an ethylenically unsaturated double bond during production or storage of the photosensitive composition. Suitable examples of the thermal polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis (4-methyl-6-t-butylphenol) and N-nitrosophenylhydroxyamine primary cerium salt. The addition amount of the thermal polymerization inhibitor is preferably from about 0.01 to about 5 wt % based on the weight of the entire composition. Also, if desired, a higher fatty acid derivative such as a behenic acid and a behenic acid amide, may be added and unevenly present on the surface of the photosensitive layer during the drying process after coating, so that polymerization inhibition due to oxygen can be prevented. The addition amount of the higher fatty acid derivative is preferably from about 0.5 to about 10 wt % of the entire composition.

Further, a dye or a pigment may be added for the purpose of coloring the photosensitive layer. Examples of the coloring agent include a pigment such as a phthalocyanine-base pigment, an azo-base pigment, carbon black and titanium oxide, and a dye such as Ethyl Violet, Crystal Violet, an azo-base dye, an anthraquinone-base dye and a cyanine-base dye. The added amount of the dye or the pigment is preferably from about 0.5 to about 5 wt % of the entire composition. Also, an inorganic filler or other known additives such as a plasticizer may be added so as to improve physical properties of the cured film.

Examples of the plasticizer include dioctyl phthalate, didodecyl phthalate, triethylene glycol dicaprylate, dimethyl glycol phthalate, tricresyl phosphate, dioctyl adipate, dibutyl sebacate and triacetyl glycerine, and when a binder is used, the plasticizer may be added in an amount of 10 wt % or less based on the total weight of the compound having an ethylenically unsaturated double bond and the binder.

The photopolymerizable composition of the present invention is dissolved in various organic solvents and then coated on a support. Examples of the solvent include acetone, methyl ethyl ketone, cyclohexane, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetylacetone, cyclohexanone, diacetone alcohol, ethylene glycol monomethyl ether acetate, ethylene glycol ethyl ether acetate, ethylene glycol monoisopropyl ether, ethylene glycol monobutyl ether acetate, 3-methoxypropanol, methoxymethoxyethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxypropyl acetate, N,N-dimethylformamide, dimethyl sulfoxide, γ-butyrolactone, methyl lactate and ethyl lactate. These solvents may be used individually or in combination. The solid concentration in the coating solution is suitably from 2 to 50 wt %.

The coverage thereof in terms of the weight after drying is preferably from about 0.1 to about 10 $g/m^2$, more preferably from 0.5 to 5 $g/m^2$.

As the above-described support, a dimensionally stable, plate-like material is used. Examples of the dimensionally stable, plate-like material include paper, paper laminated with plastics (e.g., polyethylene, polypropylene, polystyrene), sheet of a metal such as aluminum (including aluminum alloy), zinc and copper, a plastic film such as cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal, and paper or plastic film laminated with or having evaporated thereon the above-described metal. Among these supports, an aluminum plate is particularly preferred because it is dimensionally stable to an extreme extent and in addition, cheap. Also, a composite sheet obtained by bonding an aluminum sheet on a polyethylene terephthalate film as described in JP-B-48-18327 is preferred.

A support having a metal, particularly aluminum surface is preferably subjected to surface treatment such as graining treatment, dipping treatment in an aqueous solution of sodium silicate, potassium fluorozirconate or phosphate, or anodic oxidation treatment.

An aluminum plate subjected to graining and then to dipping treatment in an aqueous solution of sodium silicate may be preferably used. Further, an aluminum plate subjected to anodic oxidation treatment and then to dipping treatment in an aqueous solution of alkali metal silicate as described in JP-B-47-5125 may be suitably used. The above-described anodic oxidation treatment is performed by applying current using the aluminum plate as an anode in an electrolyte comprising an aqueous or non-aqueous solution of, for example, an inorganic acid such as phosphoric acid, chromic acid, sulfuric acid or boric acid, an organic acid such as oxalic acid or sulfamic acid, a salt thereof, or a combination of two or more thereof.

The silicate electrodeposition as described in U.S. Pat. No. 3,658,662 is also effective.

Further, a surface treatment comprising a combination of the above-described anodic oxidation treatment and sodium silicate treatment on a support subjected to electrolysis graining as disclosed in JP-B-46-27481, JP-A-52-58602 and JP-A-52-30503 is also effective.

Furthermore, a support subjected in sequence to mechanical graining, chemical etching, electrolysis graining, anodic oxidation treatment and sodium silicate treatment as disclosed in JP-A-56-28893 is also preferred.

Still further, a support may be suitably subjected, after the above-described treatments, to undercoating with a water-soluble resin such as a polymer or copolymer having a polyvinyl phosphonic acid or sulfonic acid group on the side chain, a polyacrylic acid, a water-soluble metal salt (e.g., zinc borate), a yellow dye or an amine salt.

Still further, a sol-gel treated substrate having covalent-bonded thereto a functional group capable of addition reaction by radicals as described in JP-A-7-159983 may be used suitably.

The above-described treatments to achieve hydrophilicity are effected not only to render the support surface hydrophilic but also to prevent harmful reaction of the photopolymerizable composition to be coated on the support and at the same time, to improve the adhesion property of the photosensitive layer.

In order to prevent polymerization inhibition action of the oxygen in air, a protective layer comprising a polymer having an excellent oxygen cutting property, such as polyvinyl alcohol, in particular, polyvinyl alcohol having a saponification degree of 99% or more, or an acidic cellulose, may be provided on the photopolymerizable composition layer on the support. The coating method of the protective layer is described in detail, for example, in U.S. Pat. No. 3,458,311 and JP-A-55-49729.

The photopolymerizable composition of the present invention can be used in usual photopolymerization. Further, the composition can be applied to various fields, for example, as a photoresist in producing a printing plate or a printed board. In particular, since the photopolymerizable composition of the present invention has properties such as high sensitivity and wide spectral sensitivity extending even to a visible light region, good effects can be provided when it is applied to a photosensitive material for a visible light laser such as an Ar$^+$ laser or a YAG-SHG laser.

The photosensitive material using the photopolymerizable composition of the present invention is subjected to imagewise exposure and then the unexposed area of the photosensitive layer is removed by a developer to obtain an image. When the above-described photopolymerizable composition is used in producing a lithographic printing plate, the developer as described in JP-B-57-7427 is preferably used and preferred are an aqueous solution of an inorganic alkali agent such as sodium silicate, potassium silicate, sodium hydroxide, potassium hydroxide, lithium hydroxide, sodium tertiary phosphate, sodium secondary phosphate, ammonium tertiary phosphate, ammonium secondary phosphate, sodium metasilicate, sodium bicarbonate or aqueous ammonia, and an aqueous solution of an organic alkali agent such as monoethanolamine or diethanolamine. The alkali agent is added such that the alkali solution has a concentration of generally from 0.1 to 10 wt %, preferably from 0.5 to 5 wt %.

The above-described alkaline aqueous solution may contain, if desired, a surface active agent or an organic solvent such as benzyl alcohol, 2-phenoxyethanol or 2-butoxyethanol, in a small amount. Examples thereof include those described in U.S. Patents Nos. 3,375,171 and 3,615,480.

Further, the developers described in JP-A-50-26601, JP-A-58-54341, JP-B-56-39464 and JP-B-56-42860 are also excellent.

Active light rays over a wide region of from ultraviolet light to visible light may be used in the present invention, and the light source which can be used includes an ultrahigh-pressure mercury lamp, a high-pressure mercury lamp, a medium-pressure mercury lamp, a low-pressure mercury lamp, a chemical lamp, a carbon arc lamp, a xenon lamp, a metal halide lamp, various laser lamps such as visible and ultraviolet laser lamps, a fluorescent lamp, a tungsten lamp and sunlight.

The present invention will be described below in greater detail by referring to the examples, but the present invention should not be construed as being limited to these examples.

EXAMPLE 1

A 0.30 mm-thick aluminum plate was dipped in a 10 wt % sodium hydroxide at 60° C. for 25 seconds to effect etching, and the plate was washed with flowing water, neutralization-washed with a 20 wt % nitric acid and then washed with water. The resulting plate was subjected to electrolysis graining treatment using a sinewaveform alternating current in a 1 wt % aqueous nitric acid solution at an anode electricity quantity of 300 coulomb/dm$^2$. Subsequently, the plate was dipped in a 1 wt % aqueous sodium hydroxide solution at 40° C. for 5 seconds and then dipped in a 30 wt % aqueous sulfuric acid solution to effect desmutting at 60° C. for 40 seconds. Thereafter, the plate was subjected to anodic oxidation treatment in a 20 wt % aqueous sulfuric acid solution at a current density of 2 A/dm$^2$ for 2 minutes to give an anodically oxidized film having a thickness of 2.7 g/m$^2$. The surface roughness measured was 0.3 µm (Ra indication according to JIS B0601).

On the back surface of the substrate treated as above, the following sol-gel reaction solution was coated by means of a bar coater and dried at 100° C. for 1 minute to prepare a support having thereon a backcoat layer having a coated amount after drying of 70 mg/m$^2$.

| Sol-Gel Reaction Solution | |
| --- | --- |
| Tetraethyl silicate | 50 parts by weight |
| Water | 20 parts by weight |
| Methanol | 15 parts by weight |
| Phosphoric acid | 0.05 part by weight |

The above-described components were mixed and stirred and after about 5 minutes, generation of heat started. After reacting the mixture for 60 minutes, the following solution was added to prepare a backcoat coating solution.

| | |
| --- | --- |
| Pyrrogalolformaldehyde condensed resin (molecular weight: 2,000) | 4 parts by weight |
| Dimethyl phthalate | 5 parts by weight |
| Fluorine-base surface active agent (N-butylperfluorooctane sulfonamidoethyl acrylate/ polyoxyethylene acrylate | 0.7 part by weight |

-continued

| | |
|---|---|
| copolymer; molecular weight: 20,000) | |
| Methanol silica sol (produced by Nissan Chemical Industries, Ltd.; methanol: 30 wt. %) | 50 parts by weight |
| Methanol | 800 parts by weight |

On the thus treated aluminum plate, a photopolymerizable composition having the following composition was coated to have a dry coated amount of 1.4 g/m² and dried at 80° C. for 2 minutes to form a photosensitive layer.

| | |
|---|---|
| Pentaerythritol tetraacrylate | 1.5 g |
| Allyl methacrylate/methacrylic acid copolymer (copolymerization molar ratio: 80/20) | 2.0 g |
| Sensitizing dye (Table 1) | |
| Titanocene compound (Table 1) | $3.0 \times 10^{-4}$ mol |
| Compound selected from additives (a) to (h) (Table 1) | $3.0 \times 10^{-4}$ mol |
| Fluorine-base nonionic surface active agent (F-177P) | 0.03 g |
| Thermal polymerization inhibitor: N-nitrosphenylhydroxylamine aluminum salt | 0.01 g |
| Pigment dispersion | 2.0 g |
| Composition of pigment dispersion: | |
| Pigment Blue 15:6 | 30 parts by weight |
| Allyl methacrylate/ methacrylic acid copolymer (copolymerization molar ratio: 83/17) | 20 parts by weight |
| Cyclohexanone | 35 parts by weight |
| Methoxypropyl acetate | 35 parts by weight |
| Propylene glycol monomethyl ether | 80 parts by weight |
| Methyl ethyl ketone | 20 g |
| Propylene glycol monomethyl ether | 20 g |

On this photosensitive layer, a 3 wt % aqueous solution of polyvinyl alcohol (saponification degree: 98 mol %, polymerization degree: 550) was coated to have a dry coated weight of 2 g/m² and dried at 100° C. for 2 minutes.

In this way, Photosensitive Material Nos. 1 to 33 (Table 1) using the photopolymerizable composition of the present invention were prepared.

Photopolymerization compositions were obtained in the same manner as the photopolymerization compositions obtained above except for changing the sensitizing dye, the titanocene compound and the compound selected from additives (a) to (h) as shown in Table 2, and using each of these photopolymerizable compositions, Photosensitive Material Nos. 51 to 58 for comparison were prepared.

Onto each of the thus-prepared photosensitive materials, a Fuji PS step guide (gray scale discontinuously varied in the transmission density at ΔD=0.15) manufactured by Fuji Photo Film Co., Ltd. was adhered, and exposure was applied thereon.

The light source used was a xenon lamp and the light was irradiated through Kenko Optical Filter BP-49 at 0.0132 mW/cm² for 80 seconds.

Each exposed photosensitive material was heated at 120° C. for 20 seconds and then developed. The sensitivity was shown by the clear step number of the PS step guide after the development. As the step number is larger, the sensitivity is higher. The development was performed using the following developer under conditions of 25° C. and dipping time of 10 seconds.

| | |
|---|---|
| DP-4 (produced by Fuji Photo Film Co., Ltd.) | 66.5 g |
| Water | 881.4 g |
| Lipomin LA (20 wt. % aqueous solution) | 52.1 g |

The results obtained are shown in Tables 1 and 2. Comparative Dye SD-1 is shown below. Further, structural formulae of Compounds d-1, e-41, f-1 and h-1 selected from additives (a) to (h) are also shown below.

TABLE 1

| Photosensitive Material No. | Sensitizing Dye | Titanocene Compound | Compound selected from Additives (a) to (h) [addition amount: g] | Step Number (clear) of Gray Scale |
|---|---|---|---|---|
| 1 (Invention) | No. 8 | A-3 | — | 4.5 |
| 2 (Invention) | No. 11 | A-3 | — | 4 |
| 3 (Invention) | No. 19 | A-3 | — | 6 |
| 4 (Invention) | No. 22 | A-3 | — | 4.5 |
| 5 (Invention) | No. 26 | A-3 | — | 5 |
| 6 (Invention) | No. 19 | A-2 | — | 6 |
| 7 (Invention) | No. 26 | A-2 | — | 5 |
| 8 (Invention) | No. 19 | A-1 | — | 6 |
| 9 (Invention) | No. 26 | A-1 | — | 5 |
| 10 (Invention) | No. 8 | A-3 | a-19 [0.1] | 6 |
| 11 (Invention) | No. 8 | A-3 | b-1 [0.2] | 7 |
| 12 (Invention) | No. 8 | A-3 | c-9 [0.2] | 7 |
| 13 (Invention) | No. 8 | A-3 | d-1 [0.3] | 8 |
| 14 (Invention) | No. 8 | A-3 | e-41 [0.4] | 7 |
| 15 (Invention) | No. 8 | A-3 | f-1 [0.5] | 8 |
| 16 (Invention) | No. 8 | A-3 | g-26 [0.2] | 8 |
| 17 (Invention) | No. 8 | A-3 | h-1 [0.2] | 6 |
| 18 (Invention) | No. 19 | A-3 | a-19 [0.1] | 7 |
| 19 (Invention) | No. 19 | A-3 | b-1 [0.2] | 8.5 |
| 20 (Invention) | No. 19 | A-3 | c-9 [0.2] | 8.5 |
| 21 (Invention) | No. 19 | A-3 | d-1 [0.3] | 9.5 |
| 22 (Invention) | No. 19 | A-3 | e-41 [0.4] | 8.5 |
| 23 (Invention) | No. 19 | A-3 | f-1 [0.5] | 9 |
| 24 (Invention) | No. 19 | A-3 | g-26 [0.2] | 9 |
| 25 (Invention) | No. 19 | A-3 | h-1 [0.2] | 6.5 |
| 26 (Invention) | No. 26 | A-3 | a-19 [0.1] | 6 |
| 27 (Invention) | No. 26 | A-3 | b-1 [0.2] | 7.5 |
| 28 (Invention) | No. 26 | A-3 | c-9 [0.2] | 7.5 |
| 29 (Invention) | No. 26 | A-3 | d-1 [0.3] | 8.5 |
| 30 (Invention) | No. 26 | A-3 | e-41 [0.4] | 7.5 |
| 31 (Invention) | No. 26 | A-3 | f-1 [0.5] | 8 |
| 32 (Invention) | No. 26 | A-3 | g-26 [0.2] | 8 |
| 33 (Invention) | No. 26 | A-3 | h-1 [0.2] | 6 |

TABLE 2

| Photosensitive Material No. | Sensitizing Dye | Titanocene Compound | Compound selected from Additives (a) to (h) [addition amount: g] | Step Number (clear) of Gray Scale |
|---|---|---|---|---|
| 51 (Comparison) | No. 8 | — | — | 0 |
| 52 (Comparison) | No. 11 | — | — | 0 |
| 53 (Comparison) | No. 19 | — | — | 0 |
| 54 (Comparison) | No. 22 | — | — | 0 |
| 55 (Comparison) | No. 22 | A-3 | — | 0 |
| 56 (Comparison) | No. 22 | A-2 | — | 0 |
| 57 (Comparison) | Comparative Dye SD-1 | A-3 | — | 0 |
| 58 (Comparison) | Comparative Dye SD-1 | A-3 | b-1 [0.2] | 0 |

Comparative Dye SD-1:

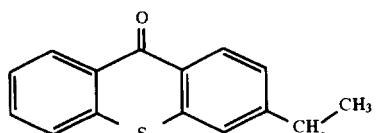

d-1

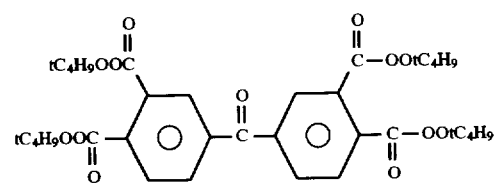

e-41

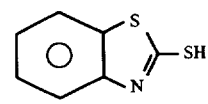

f-1

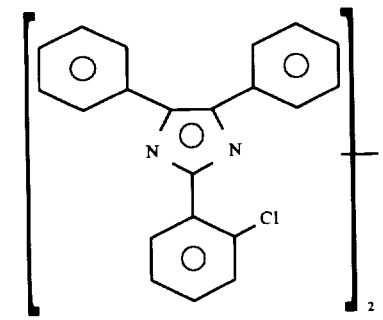

h-1

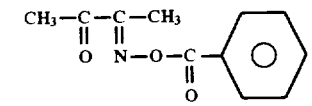

It is clearly seen from the results in Tables 1 and 2 that the photopolymerizable compositions of the present invention containing, as the photopolymerization initiation system, the sensitizing dye of the present invention and the titanocene compound exhibited high sensitivity.

Further, when a compound selected from additives (a) to (h) was used in combination, still higher sensitivity could be obtained. On the contrary, when the photopolymerization initiation system contained only one of the sensitizing dye and the titanocene compound or even if both were contained, when they were an analogous compound, the effect of the present invention could not be obtained.

The photopolymerizable composition of the present invention exhibits high sensitivity to active light rays over a wide region of from ultraviolet light to visible light. Accordingly, the light source which can be used includes an ultrahigh-pressure mercury lamp, a high-pressure mercury lamp, a medium-pressure mercury lamp, a low-pressure mercury lamp, a chemical lamp, a carbon arc lamp, a xenon lamp, a metal halide lamp, various laser lamps such as visible and ultraviolet laser lamps, a fluorescent lamp, a tungsten lamp and sunlight.

While the invention has been described in detail and with reference to specific embodiments thereof, it will be apparent to one skilled in the art that various changes and modifications can be made therein without departing from the spirit and scope thereof.

What is claimed is:

1. A photopolymerizable composition comprising i) an addition polymerizable compound having an ethylenically unsaturated double bond, ii) a sensitizing dye represented by the following formula (I) and iii) a titanocene compound:

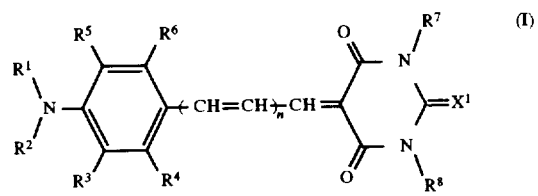

wherein $R^1$, $R^2$, $R^7$ and $R^8$ each represents a hydrogen atom, a substituted or unsubstituted alkyl group, a substituted or unsubstituted aryl group or a substituted or unsubstituted alkenyl group, $R^3$, $R^4$, $R^5$ and $R^6$ each represents a hydrogen atom, a halogen atom, a substituted or unsubstituted alkyl group, a substituted or unsubstituted aryl group, a substituted or unsubstituted alkoxy group or a substituted or unsubstituted alkoxycarbonyl group, $R^1$ and $R^2$ may be combined with each other to form a ring together with the nitrogen atom or $R^1$ and $R^5$ or $R^2$ and $R^3$ may be combined with each other to form a ring together with the carbon atoms and the nitrogen atom, $R^3$ and $R^4$ or $R^5$ and $R^6$ may be combined with each other to form a ring together with the two carbon atoms, $X^1$ represents an oxygen atom or a sulfur atom, and n represents 0, 1 or 2.

2. The photopolymerizable composition of claim 1 wherein the amount of the sensitizing dye is 0.05 to 30 parts by weight per 100 parts by weight of the addition polymerizable compound having an ethylenically unsaturated double bond.

3. The photopolymerizable composition of claim 1 wherein the amount of the titanocene compound is 0.5 to 100 parts by weight per 100 parts by weight of the addition polymerizable compound having an ethylenically unsaturated double bond.

4. The photopolymerizable composition of claim 1 wherein the titanocene compound is selected from the group consisting of dicyclopentadienyl-Ti-dichloride dicyclopentadienyl-Ti-bisphenyl, dicyclopentadienyl-Ti bis-2,3,4,5,6-pentafluorophen-1-yl, dicyclopentadienyl-Ti bis-2,3,5,6-tetrafluorophen-1-yl,dicyclopentadienyl-Ti-bis 2,4,6-trifluorophen-1-yl, dicyclopentadienyl-Ti-bis-2,6 difluorophen-1-yl, dicyclopentadienyl-Ti-bis-2,4 difluorophen-1-yl, dimethylcyclopentadienyl-Ti-bis-2,3,4,5 6-pentafluorophen-1-yl, dimethylcylopentadienyl-Ti-bis-2 3,5,6-tetrafluorophen-1-yl, dimethylcyclopentadienyl-T: bis-2,4-difluorophen-1-yl and bis(cyclopentadienyl)-bis(2 6-difluoro-3-(pyr-1-yl)-phenyl)titanium.

5. The photopolymerizable composition of claim 1, whic further contains at least one compound selected from th group consisting of the following components (a) to (h):

(a) a compound having a carbon-halogen bond;

(b) a ketone compound represented by the followir formula (II):

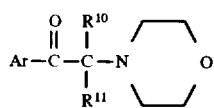
(II)

wherein Ar represents an aromatic group represented by the following formula, $R^{10}$ and $R^{11}$ each represents a hydrogen atom or a substituted or unsubstituted alkyl group, $R^{10}$ and $R^{11}$ may be combined with each other to form a ring together with the carbon atom which both $R^{10}$ and $R^{11}$ are bonded to, and the ring formed by $R^{10}$, $R^{11}$ and the carbon atom may be a divalent group linking the carbonyl group and the morpholino group:

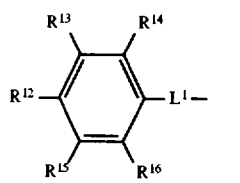

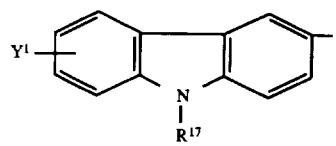

wherein $R^{12}$, $R^{13}$, $R^{14}$, $R^{15}$ and $R^{16}$, which may be the same or different, each represents a hydrogen atom, a halogen atom, a substituted or unsubstituted alkyl group, a substituted or unsubstituted alkenyl group, a substituted or unsubstituted aryl group, a hydroxyl group, a substituted or unsubstituted alkoxy group, —S—$R^{18}$, —SO—$R^{18}$ or —$SO_2$—$R^{18}$, wherein $R^{18}$ represents a hydrogen atom, a substituted or unsubstituted alkyl group or a substituted or unsubstituted alkenyl group, $L^1$ represents a bond or a substituted or unsubstituted alkylene group, provided that when $L^1$ is a bond, at least one of $R^{12}$, $R^{13}$, $R^{14}$, $R^{15}$ and $R^{16}$ is —S—$R^{18}$ or —SO—$R^{18}$, $R^{17}$ represents a hydrogen atom, a substituted or unsubstituted alkyl group or a substituted or unsubstituted acyl group, and $Y^1$ represents a hydrogen atom or a substituted carbonyl group represented by the following formula:

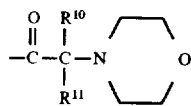

wherein $R^{10}$ and $R^{11}$ each has the same meaning as defined in formula (II);

(c) a ketoxime compound represented by the following formula (III):

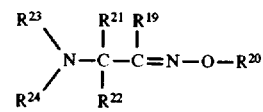
(III)

wherein $R^{19}$ and $R^{20}$, which may be the same or different, each represents an aliphatic hydrocarbon group, an aromatic hydrocarbon group or a heterocyclic group, which may have a substituent and an unsaturated bond, $R^{21}$ and $R^{22}$, which may be the same or different, each represents a hydrogen atom, an aliphatic hydrocarbon group or an aromatic hydrocarbon group, which may have an unsaturated bond and/or a substituent, a heterocyclic group, a hydroxy group, a substituted oxy group, a mercapto group or a substituted thio group, $R^{23}$ and $R^{24}$ each represents a hydrogen atom, an aliphatic hydrocarbon group or an aromatic hydrocarbon group, which may have an unsaturated bond and/or a substituent, or a substituted carbonyl group, $R^{23}$ and $R^{24}$ may be combined with each other to form a ring having from 2 to 8 carbon atoms, and the ring may contain at least one of —O—, —$NR^{23}$—, wherein $R^{23}$ has the same meaning as above, —O—CO—, —NH—CO—, —S— and —$SO_2$— in the linking main chain;

(d) an organic peroxide;

(e) a thio compound represented by the following formula (IV):

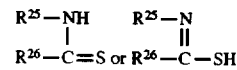
(IV)

wherein $R^{25}$ represents a substituted or unsubstituted alkyl group or a substituted or unsubstituted aryl group, $R^{26}$ represents a hydrogen atom or a substituted or unsubstituted alkyl group, $R^{25}$ and $R^{26}$ may be combined with each other to provide an atomic group necessary for completing a heterocyclic ring which may have a condensed ring, together with the carbon atom and the nitrogen atom;

(f) hexaarylbiimidazole;

(g) an aromatic onium salt; and (h) a ketoxime ester.

* * * * *

UNITED STATES PATENT AND TRADEMARK OFFICE
CERTIFICATE OF CORRECTION

PATENT NO. : 5,776,996
DATED : July 7, 1998
INVENTOR(S) : Yasuo OKAMOTO et al.

It is certified that error appears in the above-identified patent and that said Letters Patent is hereby corrected as shown below:

On the title page, item [30] insert the following:

Foreign Application Priority Data

Feb. 29, 1996      [JP]    Japan      8-069213    --.

Signed and Sealed this

Twentieth Day of July, 1999

*Attest:*

Q. TODD DICKINSON

*Attesting Officer*      *Acting Commissioner of Patents and Trademarks*